(12) United States Patent
Sun et al.

(10) Patent No.: US 11,870,720 B2
(45) Date of Patent: Jan. 9, 2024

(54) CHANNEL STATE INFORMATION REFERENCE SIGNAL CONFIGURATION

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/179,305

(22) Filed: Feb. 18, 2021

(65) Prior Publication Data

US 2021/0266126 A1 Aug. 26, 2021

Related U.S. Application Data

(60) Provisional application No. 62/981,947, filed on Feb. 26, 2020.

(51) Int. Cl.
*H04L 5/00* (2006.01)
*H04W 24/10* (2009.01)

(52) U.S. Cl.
CPC .......... *H04L 5/0048* (2013.01); *H04W 24/10* (2013.01)

(58) Field of Classification Search
CPC ..... H04L 5/0048; H04L 5/0094; H04L 5/005; H04W 24/10; H04B 7/0695
See application file for complete search history.

(56) References Cited

U.S. PATENT DOCUMENTS

| | | | |
|---|---|---|---|
| 2017/0245165 A1* | 8/2017 | Onggosanusi | H04W 24/08 |
| 2019/0215119 A1* | 7/2019 | Kim | H04L 5/0048 |
| 2020/0305183 A1* | 9/2020 | Papasakellariou | H04W 52/243 |
| 2021/0083730 A1* | 3/2021 | Hwang | H04B 17/309 |
| 2021/0167920 A1* | 6/2021 | Cha | H04L 5/0048 |
| 2021/0392668 A1* | 12/2021 | Yoon | H04W 72/0446 |

OTHER PUBLICATIONS

3GPP TS 38.331 V15.8.0 (Jan. 2020), 5G; NR; Radio Resource Control (RRC); Protocol specification, ETSI, Jan. 2020 (Year: 2020).*

Giordani et al., "A Tutorial on Beam Management for 3GPP NR at mmWave Frequencies", IEEE, 2019 (Year: 2019).*

* cited by examiner

*Primary Examiner* — Justin T Van Roie
(74) *Attorney, Agent, or Firm* — Loza & Loza LLP

(57) ABSTRACT

A channel state information reference signal configuration (CSI-RS configuration) indicates a period and a plurality of offsets. For example, a base station may send a channel state information reference signal (CSI-RS) to a wireless communication device (e.g., a user equipment) according to the period and at least one of the offsets indicated by the CSI-RS configuration.

28 Claims, 15 Drawing Sheets

CHANNEL STATE INFORMATION REFERENCE SIGNAL CONFIGURATION

CROSS-REFERENCE TO RELATED APPLICATIONS

The present application for patent claims priority to and the benefit of U.S. Provisional Application No. 62/981,947, titled "CHANNEL STATE INFORMATION REFERENCE SIGNAL CONFIGURATION," filed Feb. 26, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly but not exclusively, to a channel state information reference signal configuration.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a scheduled entity such as a user equipment (UE) may access a first cell of a first scheduling entity (e.g., a base station, such as a gNode B (gNB)) and/or access a second cell of a second scheduling entity.

Some wireless communication networks use a channel state information reference signal (CSI-RS) for channel estimation. For example, a base station (BS) may send a CSI-RS to a user equipment (UE) and, in response, the UE sends a measurement report based on the CSI-RS to the BS. The BS may then use the measurement report to estimate one or more characteristics of a channel between the BS and the UE.

BRIEF SUMMARY OF SOME EXAMPLES

The following presents a summary of several aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

In some examples, the disclosure provides a user equipment configured for wireless communication that includes a processor, a transceiver, and a memory that are communicatively coupled to one another. The processor and the memory are configured to receive, from a base station via the transceiver, a channel state information reference signal configuration (CSI-RS configuration) that indicates a period and a plurality of offsets, and to receive a channel state information reference signal (CSI-RS) from the base station via the transceiver and a wireless channel of a shared radio frequency spectrum band according to the period and at least one of the plurality of offsets. The processor and the memory are also configured to generate a measurement report based on the CSI-RS, and send the measurement report to the base station via the transceiver.

In some examples, the disclosure provides a method for wireless communication at a user equipment. The method includes receiving, from a base station, a channel state information reference signal configuration (CSI-RS configuration) that indicates a period and a plurality of offsets, receiving a channel state information reference signal (CSI-RS) from the base station via a wireless channel of a shared radio frequency spectrum band according to the period and at least one of the plurality of offsets, generating a measurement report based on the CSI-RS, and sending the measurement report to the base station.

In some examples, the disclosure provides a user equipment. The user equipment includes means for receiving, from a base station, a channel state information reference signal configuration (CSI-RS configuration) that indicates a period and a plurality of offsets, means for receiving a channel state information reference signal (CSI-RS) from the base station via a wireless channel of a shared radio frequency spectrum band according to the period and at least one of the plurality of offsets, means for generating a measurement report based on the CSI-RS, and means for sending the measurement report to the base station.

In some examples, the disclosure provides an article of manufacture for use by a user equipment in a wireless communication network. The article includes a computer-readable medium having stored therein instructions executable by one or more processors of the user equipment to receive, from a base station, a channel state information reference signal configuration (CSI-RS configuration) that indicates a period and a plurality of offsets, receive a channel state information reference signal (CSI-RS) from the base station via a wireless channel of a shared radio frequency spectrum band according to the period and at least one of the plurality of offsets, generate a measurement report based on the CSI-RS, and send the measurement report to the base station.

In some examples, the disclosure provides a base station configured for wireless communication that includes a processor, a transceiver, and a memory that are communicatively coupled to one another. The processor and the memory are configured to send, to a user equipment via the transceiver, a channel state information reference signal configuration (CSI-RS configuration) that indicates a period and a plurality of offsets, and to send a channel state information reference signal (CSI-RS) to the user equipment via the transceiver and a wireless channel of a shared radio frequency spectrum band according to the period and at least one of the plurality of offsets. The processor and the memory are also configured to receive a measurement report from the user equipment via the transceiver after sending the CSI-RS.

In some examples, the disclosure provides a method for wireless communication at a base station. The method includes sending, to a user equipment, a channel state information reference signal configuration (CSI-RS configuration) that indicates a period and a plurality of offsets, sending a channel state information reference signal (CSI-RS) to the user equipment via a wireless channel of a shared radio frequency spectrum band according to the period and at least one of the plurality of offsets, and receiving a measurement report from the user equipment after sending the CSI-RS.

In some examples, the disclosure provides a base station. The base station includes means for sending, to a user equipment, a channel state information reference signal configuration (CSI-RS configuration) that indicates a period and a plurality of offsets, means for sending a channel state information reference signal (CSI-RS) to the user equipment via a wireless channel of a shared radio frequency spectrum band according to the period and at least one of the plurality of offsets, and means for receiving a measurement report from the user equipment after sending the CSI-RS.

In some examples, the disclosure provides an article of manufacture for use by a base station in a wireless communication network. The article includes a computer-readable medium having stored therein instructions executable by one or more processors of the base station to send, to a user equipment, a channel state information reference signal configuration (CSI-RS configuration) that indicates a period and a plurality of offsets, send a channel state information reference signal (CSI-RS) to the user equipment via a wireless channel of a shared radio frequency spectrum band according to the period and at least one of the plurality of offsets, and receive a measurement report from the user equipment after sending the CSI-RS.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
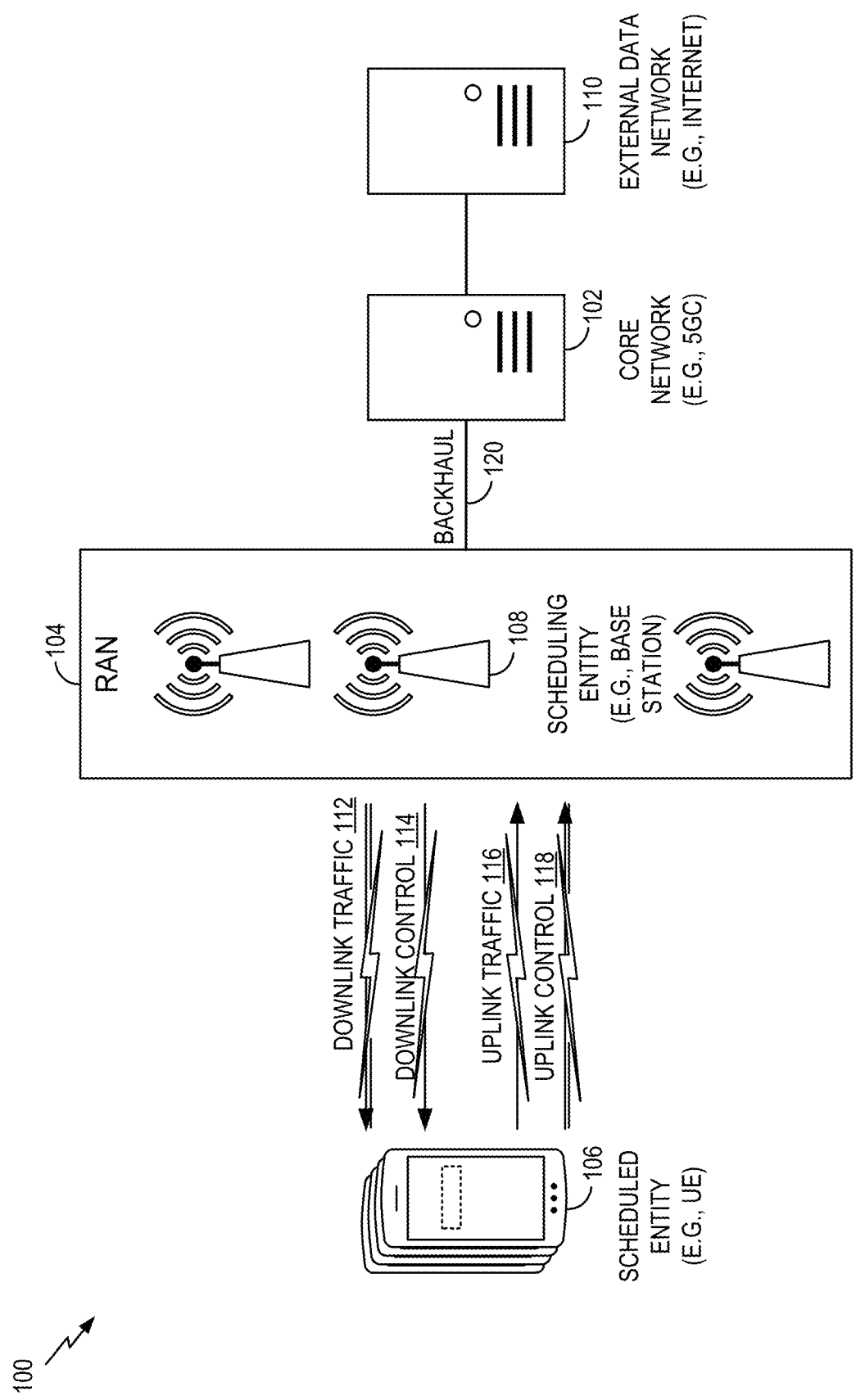
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Additionally, well-known elements will not be described in detail or will be omitted so as not to obscure the relevant details of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to a channel state information reference signal configuration (CSI-RS configuration) that indicates a period and a plurality of offsets. In some examples, a base station may select the offsets to facilitate transmission of CSI-RS over a wireless communication resource using a listen-before-talk (LBT) resource contention scheme. The base station may send the CSI-RS configuration with multiple offsets to a UE. In addition, the base station may send a channel state information reference signal (CSI-RS) to the UE according to the period and at least one of the offsets indicated by the CSI-RS configuration. The UE may use the CSI-RS configuration to receive CSI-RS sent by the base station according to at least one of the offsets (or none of the offsets if the LBT failed).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
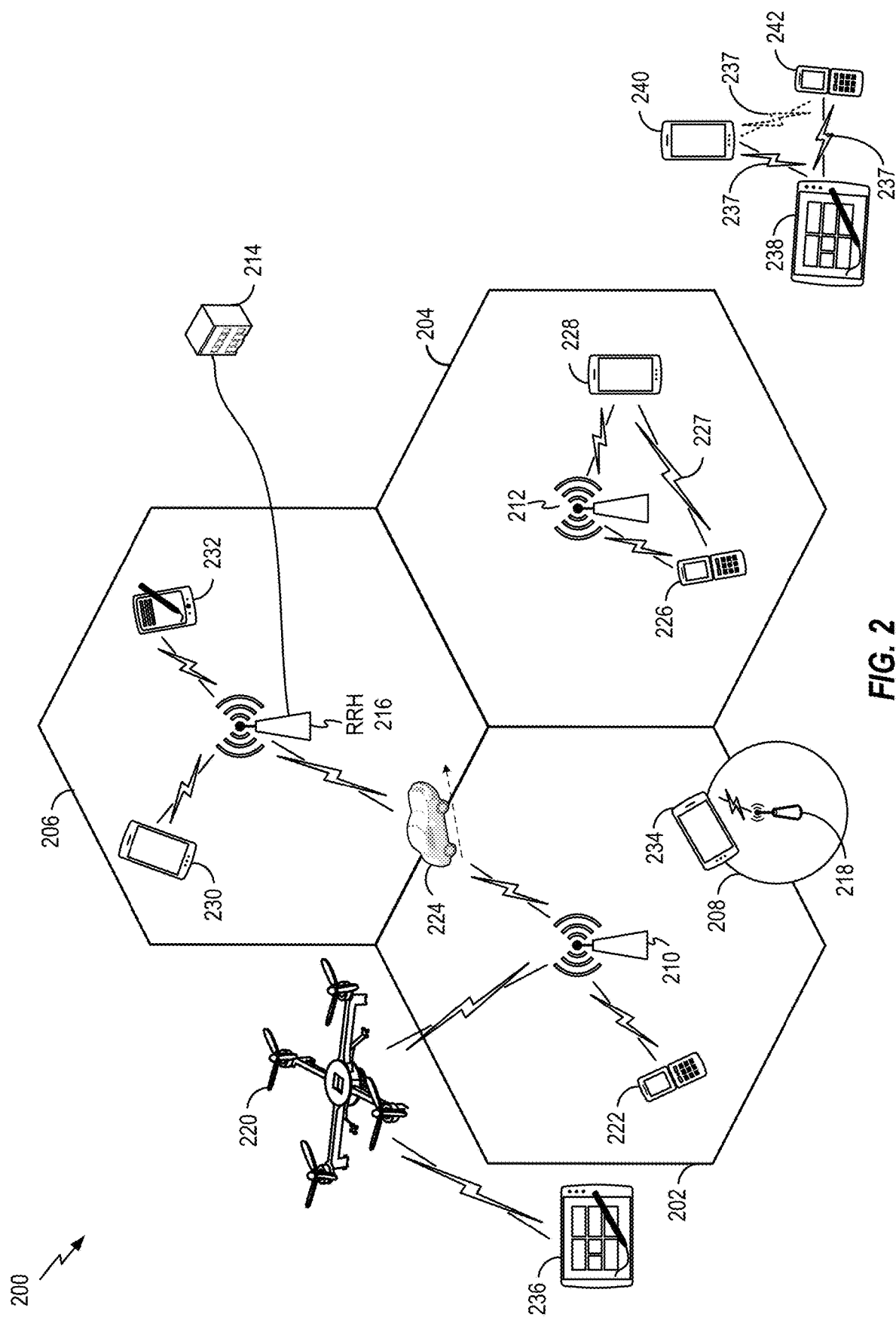
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving the UE 236). That is, in some examples, a cell may not necessarily be stationary, and the geographic area of the cell may move according to the location of a mobile base station such as a UAV 220.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network. In some examples, the sidelink signals 227 and 237 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
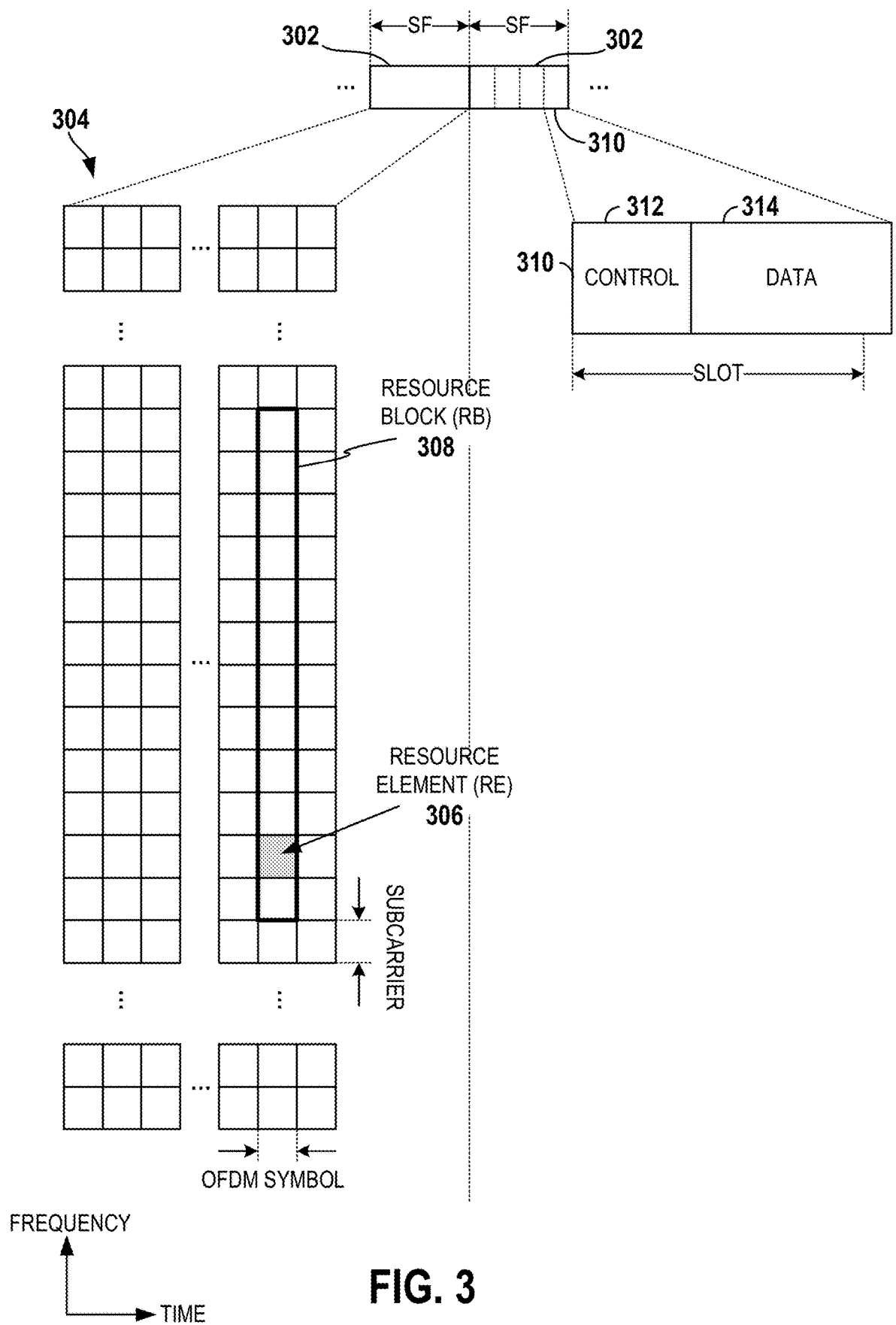
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. In some examples, a given antenna port may correspond to a particular set of antenna elements and/or other beamforming parameters (e.g., signal phases and/or amplitudes). The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As discussed above, a network may use a shared spectrum such as unlicensed spectrum in some scenarios. For example, a network operator may deploy cells that are configured to communicate on an unlicensed spectrum (e.g., in addition to cells operating on a licensed spectrum) to extend the coverage of the network and/or to provide additional services (e.g., higher throughput) to UEs operating under the network.

In some scenarios, devices that transmit over unlicensed spectrum may use a collision avoidance scheme to reduce the possibility that multiple devices will transmit over the same band at the same time. One example of such a collision avoidance scheme is a listen-before-talk (LBT) procedure. In general, before a first device transmits on a resource, the first device may listen for transmissions by another device. If the resource is currently being used, the first device may back-off for a period of time and then re-attempt transmission (e.g., by listening for other transmissions again). Carrier sense multiple access (CSMA) is one example of an LBT procedure. Other types of LBT procedures may be used as well.

Different types of LBT procedures may be defined according to different categories. For example, Category 1 (Cat. 1) LBT specifies that LBT is not used. Cat. 2 LBT specifies the use of LBT without random back-off. Cat. 3 LBT specifies the use of LBT with random back-off with a fixed size contention window. Cat. 4 LBT specifies the use of LBT with random back-off with a variable sized contention window.

NR operation in the unlicensed band may be referred to as NR-U. Under NR-U, some transmissions may be subject to LBT. For example, under NR-U, a gNB's transmission of discovery reference signals (DRSs) such as the SSB discussed above may be subject to LBT.

Thus, in NR, a wireless communication device such as a user equipment (UE) or a base station may perform a clear channel assessment (CCA), such as listen-before-talk (LBT), prior to gaining control of a wireless channel in the unlicensed band. In some examples, a base station may gain access to the wireless channel and transmit a synchronization signal block (SSB) (e.g., during a discovery reference signal (DRS) slot). The SSB may carry synchronization signals and reference signals for a UE to discover and synchronize with the base station. In some examples, there may be transmission gaps between SSBs in a DRS slot. In unlicensed wireless communications, another wireless communication device may attempt to gain control of the transmission medium during a transmission gap between SSBs, which may interrupt the DRS slot at the base station. This may force the base station to wait for the other wireless communication device to finish transmitting, then attempt to regain control of the transmission medium and, if successful, transmit SSBs in another DRS slot. Since the SSB includes important information for initial access, radio link monitoring (RLM), and radio resource management (RRM), it is desirable to increase the likelihood that a gNB can transmit the SSB in the face of LBT-related channel access uncertainty.

One approach to increase the likelihood that the SSB will be transmitted in NR-U is based on a candidate SSB position concept. Within a period of time (e.g., 5 milliseconds, ms), up to 20 (or 10) SSB positions are defined for 30 kHz (or 15 kHz) subcarrier spacing (respectively). Here, a quasi-co-location (QCL) relation factor Q is defined such that the SSB positions Q apart are quasi-co-located (QCL'ed). In one example, Q=1, 2, 4, 8. Other values of Q are possible. If a gNB fails to transmit the SSB at position x (e.g., due to the unlicensed band being busy), the gNB has another chance to send the SSB at the position x+Q (e.g., x+1, or x+2, or x+4, and so on).

In some examples, the antenna ports used to transmit SSBs or other signals may be referred to as being QCL'ed if the spatial parameters of a transmission on one antenna port may be inferred from the spatial parameters of another transmission on a different antenna port. Advantageously, a receiving device (e.g., a UE) may be able to perform channel estimation for demodulating data or control information received from a first set of antenna ports based on reference signals received from a second set of antenna ports that are quasi co-located with the first set of antenna ports. Thus, a QCL relationship between antenna ports may improve the chances that a UE may successfully decode a downlink transmission from a base station. In some cases, a base station may transmit to a UE an indication of which antenna ports are QCL'ed such that the UE may be able to identify additional reference signals to use for channel estimation.

In some aspects, a base station may configure a set of transmission configuration indication (TCI) states to indicate to a UE one or more QCL relationships between antenna ports used for transmitting downlink signals to the UE. Each TCI state may be associated with a set of reference signals (e.g., SSBs or different types of CSI-RSs), and the TCI state may indicate a QCL relationship between antenna ports used to transmit the set of reference signals and antenna ports used to transmit data or control information to a UE. As such, when a UE receives an indication of a particular TCI state from a base station (e.g., in DCI), the UE may determine that antenna ports used to transmit the reference signals associated with the TCI state are quasi co-located with antenna ports used to transmit data and control information to the UE. The UE may use the reference signals associated with the TCI state to perform channel estimation for demodulating data or control information received from the base station.

Figure 4:
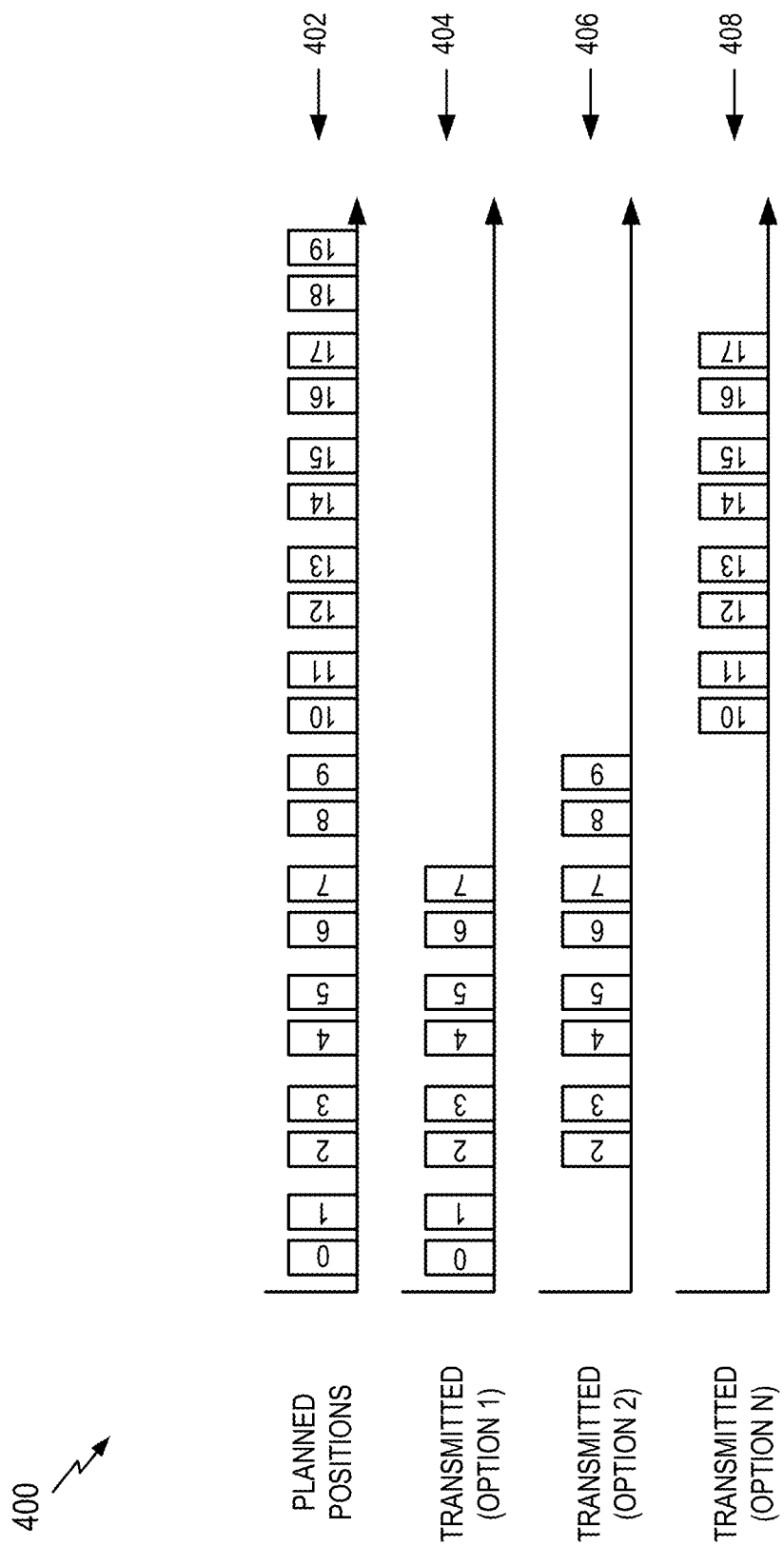
FIG. 4 is a diagram illustrating an example of synchronization signaling block transmissions that may be used according to some aspects.

FIG. 4 illustrates an example of SSB positions for a set of SSB transmissions (e.g., a set of eight SSB transmissions). As indicated in the planned positions 402, eight SSB transmissions could be planned in positions 0-7, 8-15, and so on. Here, positions 0, 8, 16, etc., may have a QCL relationship, positions 1, 9, 17, etc. may have a QCL relationship, and so on. Thus, if a transmission for one beam (e.g., at position 0) fails due to LBT, there is another opportunity to transmit that beam (e.g., at position 8, position 16, etc.).

As indicated by a first example option 404 (Option 1), a gNB may first attempt the eight SSB transmissions at positions 0-7. If the medium is busy at Option 1, the gNB may attempt the eight SSB transmissions using a second example option 406 based on Q=1 (Option 2).

In Option 2, the gNB may start the SSB transmissions at position x+1=1+1=2 (where the positions are grouped in sets of two). Thus, the gNB may attempt the eight SSB transmissions at positions 2-9. As mentioned above, position 8 and position 9 may have a respective QCL relationship with position 0 and position 1, respectively, of the planned positions 402.

If the medium is busy at Option 2, the gNB may continue reattempting the eight SSB transmissions based on different values of Q. For example, in an Nth example option 408 (Option N), the gNB may attempt the eight SSB transmissions at positions 10-17. Here, position 10 may have a QCL relationship with position 2 in the planned positions 402, position 11 may have a QCL relationship with position 3 in the planned positions 402, and so on.

A gNB may include the QCL relation factor Q in a transmitted MIB or a gNB may send a UE-specific QCL relation factor Q configured for RLM and/or RRM. Here, it may be appreciated that in some aspects the candidate SSB position modulo Q may correspond to an SSB index.

DRS transmissions may include SSBs as discussed above as well as other multiplexed signals and channels. In some examples, the channel access requirement for DRS may be relaxed to increase the likelihood of an NR-U transmission. For example, for a category 2 LBT, the channel access requirement may be relaxed if the DRS does not contain unicast data and satisfies certain length and duty cycle constraints.

In some scenarios, the CSI-RS discussed above may be sent in (e.g., multiplexed with) the DRS to satisfy an occupied channel bandwidth (OCB) requirement. For example, time division multiplexing (TDM) and/or frequency division multiplexing (FDM) may be used to send the CSI-RS with the DRS.

In some examples, a base station may multiplex channel state information (CSI) reference signals (CSI-RS) with SSBs during a DRS slot. In some cases, by multiplexing CSI-RS with SSBs during the DRS slot, the base station may prevent another wireless device from gaining control of the wireless channel before the DRS slot finishes. Also, multiplexing the CSI-RS with the SSBs during the DRS slot may satisfy an LBT requirement (or other similar guideline) that transmissions be continuous once a resource is acquired (e.g., so that another transmitter is not led to believe that the resource is free).

For CSI-RS to fill in a DRS measured timing configuration (DMTC) window, the CSI-RS may be transmitted together with the SSBs. For example, for TDM, CSI-RS may be sent between the positions 0 and 1 (and/or between other positions) of FIG. 4. This approach may be advantageous, for example, if the CSI-RS and the SSBs use the same QCL configurations.

The disclosure thus relates in some aspects to channel state information (CSI) reference signal (CSI-RS) multiplexing with synchronization signal blocks (SSBs). For example, a base station may multiplex CSI-RS with SSBs in a DRS slot in a wireless communication system supporting communications on a wireless channel of a shared radio frequency spectrum band. The base station may transmit SSBs in the DRS slot so that a UE can discover and synchronize with the base station. In some examples, there may be transmission gaps between SSBs in a DRS slot. To increase an occupied channel bandwidth (OCB) and maintain control of the shared wireless channel during the transmission gaps, a base station may multiplex CSI-RS with SSBs during the DRS slot.

The base station may use an aperiodic CSI-RS or a periodic CSI-RS for multiplexing with SSBs. For an aperiodic CSI-RS, the base station may transmit downlink control information scheduling the aperiodic CSI-RS, such that the UE can measure or rate match around the aperiodic CSI-RS. In some aspects, rate matching may involve matching encoded bits to available resources by puncturing or repeating the encoded bits.

As discussed above, there may be uncertainty as to when the SSB transmission occurs due to LBT (e.g., the SSB transmission may be considered to be floating due to this uncertainty). Thus, there may be uncertainty associated with the transmission of the CSI-RS transmission as well for the scenario where CSI-RS is multiplexed with the DRS.

The manner in which a gNB sends a CSI-RS may be signaled to a UE via a CSI-RS configuration. Conventionally, the CSI-RS configuration is based on a period (e.g., designed by a slot number) and a single offset (e.g., designated in slots) and, within a slot, the time and frequency domain resources. For example, a CSI-RS-ResourceMapping may indicate a frequency domain pattern, a number of ports, a time domain pattern in a slot, and a frequency domain allocation. In addition, a non-zero power CSI-RS resource (NZP-CSI-RS-Resource) may indicate the CSI-RS-ResourceMapping, a period, an offset, a TCI, scrambling, and a power offset. Also, an NZP-CSI-RS-ResourceSet may indicate one or more NZP-CSI-RS-Resources, a triggering offset (if aperiodic), repetition for layer 1 (L1) reference signal received power (RSRP) measurement, and a trs parameter (all resources from the same port).

The disclosure relates in some aspects to defining a CSI-RS configuration for CSI-RS in DRS or for other scenarios. In some examples, the same CSI-RS-ResourceMapping may be shared by the CSI-RS corresponding to all SSBs. However, different mappings may be desired for CSI-RS that is frequency division multiplexed (FDM'ed) with the SSB (e.g., the remaining bandwidth of SSB) and for CSI-RS that is timed division multiplexed (TDM'ed) with the SSB (e.g., on the full 20 MHz), and for CSI-RS in different symbols in a slot. For CSI-RS QCL'ed with the same SSB but transmitted at different slots (e.g., due to the SSB floating), a different CSI-RS-Resource may used. For example, the same period may be used, but with a different slot offset.

Thus, there may be considerable complexity associated with the CSI-RS configuration in the above example. Accordingly, a relatively large number of resource sets may be used for the configuration. For example, in scenarios where 64 resource sets are allocated, configuring the above information may use up all of the allocated resource sets. As a specific example, in a 20 ms period (to match the DRS transmission period), one CSI-RS may be added per slot. Thus, 10 CSI-RS resources are configured for 10 slots (20 candidate SSB positions in DRS).

The disclosure relates in some aspects to an improved configuration for CSI-RS (e.g., for the DRS NR-U scenario). For example, a CSI-RS configuration may indicate (e.g., include or define) a period and multiple offsets (instead of single offset). The CSI-RS configuration may take different forms in different implementations.

For example, in a first implementation, the CSI-ResourcePeriodicityAndOffset parameter may indicate one period and multiple offsets. This stands in contrast to a CSI-RS configuration parameter that indicates one period and one offset.

As another example, in a second implementation, the CSI-RS-Resource config parameter may include multiple CSI-ResourcePeriodicityAndOffset parameters (e.g., to support multiple offsets). In some examples, each CSI-ResourcePeriodicityAndOffset parameter may indicate one period and one offset. In some examples, each CSI-ResourcePeriodicityAndOffset parameter may indicate one period and multiple offsets.

In some examples, the periods of multiple CSI-ResourcePeriodicityAndOffset parameters in a CSI-RS-Resource may be restricted to be the same. For example, a first CSI-ResourcePeriodicityAndOffset parameter may indicate a first period (along with at least one offset) and a second CSI-ResourcePeriodicityAndOffset parameter may also indicate the first period (along with at least one offset).

In some examples, the periods of multiple CSI-ResourcePeriodicityAndOffset parameters in a CSI-RS-Resource may be different. For example, a first CSI-ResourcePeriodicityAndOffset parameter may indicate a first period (along with at least one offset), and a second CSI-ResourcePeriodicityAndOffset parameter may indicate a second period (along with at least one offset) that is different from the first period.

Through the use of such an CSI-RS configuration, the gNB will not need to configure as many CSI-RS configurations as it would for a scenario where there is one CSI-RS configuration for each of the potential positions.

The disclosure relates in some aspects to addressing a situation where a CSI-RS is not transmitted on an allocated resource (e.g., the CSI-RS was transmitted earlier in the DRS). For example, to efficiently use the resources allocated for CSI-RS, an indication may be sent to the UE that indicates that the CSI-RS will not be sent in a particular resource (e.g., slot, symbol, position, frequency band, etc.).

In some examples, for UEs not configured for CSI-RS measurement in the DRS, an indication may be sent to each UE to inform the UE that it can rate match into (e.g., use for PDSCH) a resource where the CSI-RS is not transmitted. For example, such an indication may take the form of an aperiodic zero-power CSI-RS (AP-ZP-CSI-RS) flag sent via DCI 1_1.

A UE configured to monitor periodic CSI-RS (P-CSI-RS), might not rate match into such a resource. However, an indication may still be sent to the UE indicating that the CSI-RS is transmitted (or not transmitted) in a particular resource. For example, such an indication may be sent via a slot format indicator (SFI) mechanism, if SFI is configured, to cancel the CSI-RS measurement by setting the symbols to "flexible." Thus, for a symbol previously indicated as being for a CSI-RS transmission, an SFI indication for that symbol set to "flexible" may indicate that the CSI-RS will not be sent via that symbol.

Figure 5:
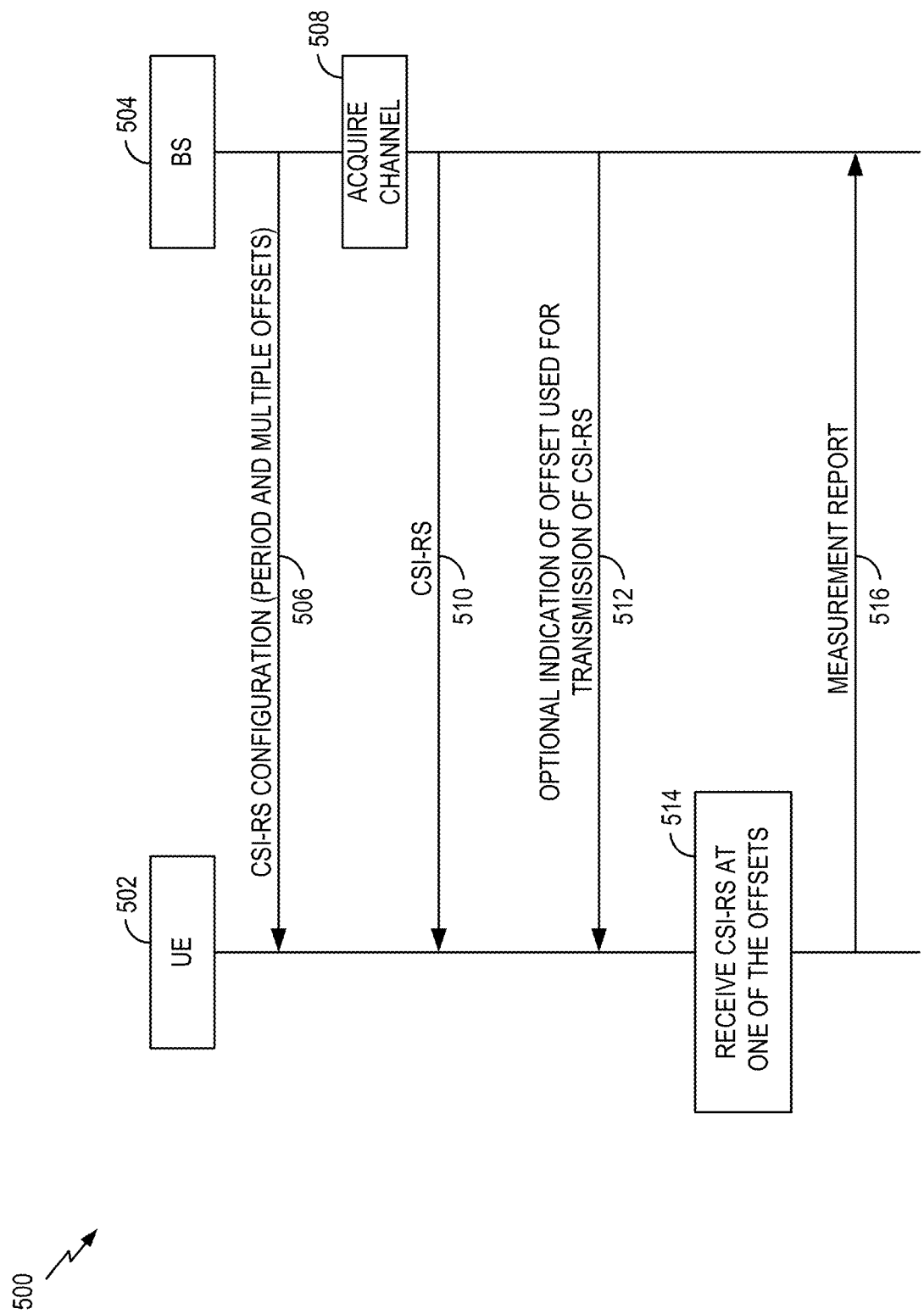
FIG. 5 is a signaling diagram illustrating an example of channel state information reference signal (CSI-RS) signaling and related signaling according to some aspects.

FIG. 5 illustrates an example of signaling in a communication system 500 according to the first example implementation. In this example, the system 500 includes a UE 502 and a base station (BS) 504 (e.g., that may operate in an unlicensed band). It should be appreciated that the system 500 would typically include other devices as well. In some implementations, the UE 502 may correspond to any of the scheduled entities or UEs of any of FIG. 1, 2, or 6. In some implementations, the BS 504 may correspond to any of the scheduling entities or UEs of any of FIG. 1, 2, or 11.

As shown by reference number 506, the BS 504 sends a CSI-RS configuration to the UE 502. As discussed herein, the CSI-RS configuration may indicate a period and multiple offsets.

As shown by reference number 508, the BS 504 may acquire a channel (e.g., using an LBT procedure) to send a CSI-RS. As discussed herein, if a transmission choice (e.g., based on a first offset) is not able to acquire a channel (e.g., the channel is busy), the BS 504 may attempt the transmission using a different offset.

As shown by reference number 510, once an available channel is acquired, the BS 504 sends the CSI-RS to the UE 502. As discussed herein, the BS 504 may send the CSI-RS using a particular offset.

As shown by optional reference number 512, the BS 504 may send to the UE 502 an indication of which offset was used (or which offsets were not used) or which resource was used (or which resources were not used) to transmit the CSI-RS. For example, this indication may take the form of an AP-ZP-CSI-RS flag, an SFI indication, or some other form. In some examples, the indication (reference number 512) may indicate which offset(s)/resource(s) will or will not be used and may be sent prior to the CSI-RS (reference number 510).

As shown by reference number 514, the UE 502 may receive the CSI-RS using one of the offsets indicated by the CSI-RS configuration received by the UE 502 at reference number 506. The UE generates a measurement report based on the received CSI-RS and, as shown by reference number 516, the UE 502 sends the measurement report to the BS 504.

Figure 6:
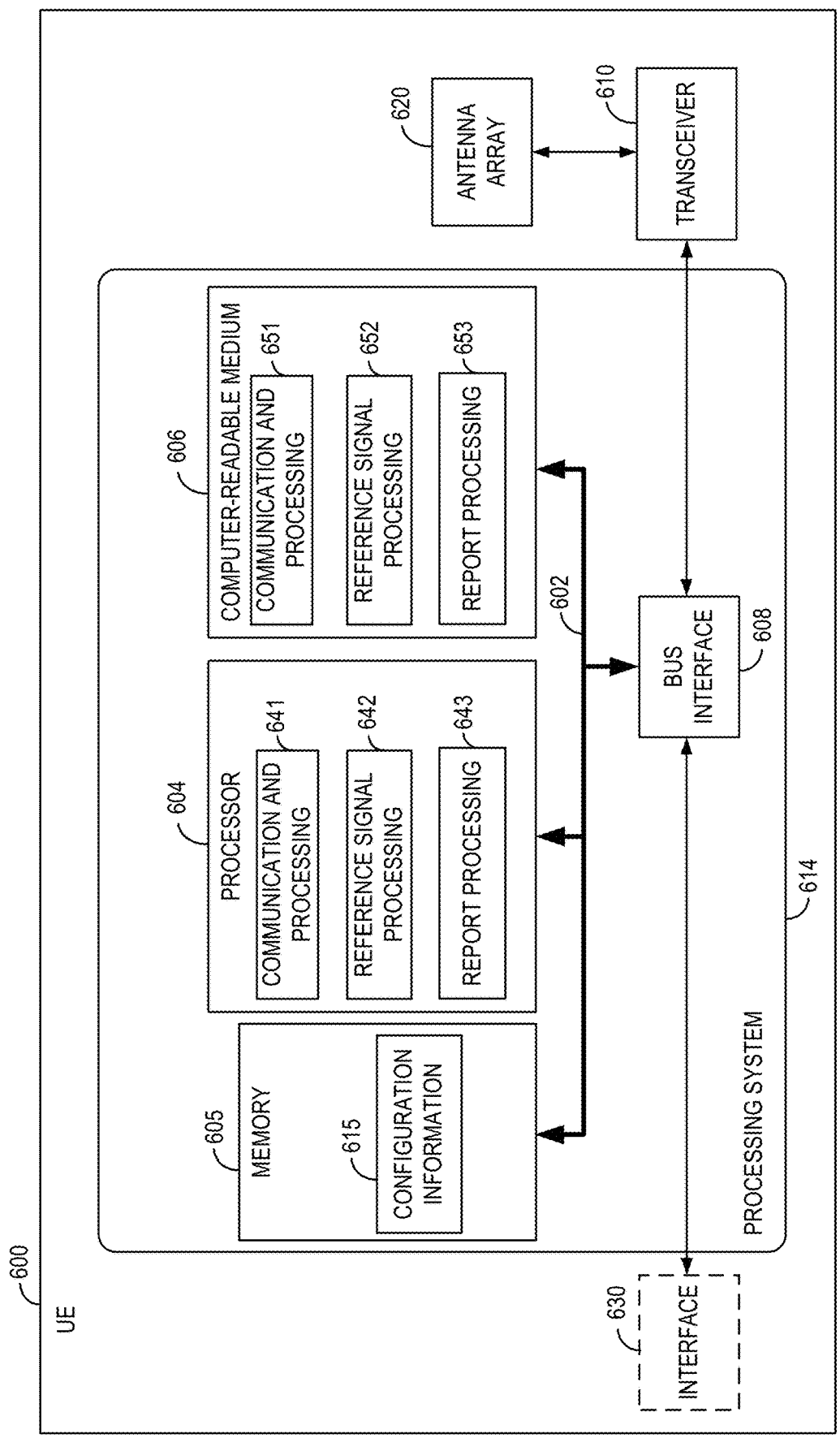
FIG. 6 is a block diagram illustrating an example of a hardware implementation for a user equipment employing a processing system according to some aspects.

FIG. 6 is a block diagram illustrating an example of a hardware implementation for a UE 600 employing a processing system 614. For example, the UE 600 may be a device configured to wirelessly communicate with a base station, as discussed in any one or more of FIGS. 1-5. In some implementations, the UE 600 may correspond to any of the UEs or scheduled entities shown in any of FIGS. 1, 2, and 5.

In accordance with various aspects of the disclosure, an element, or any portion of an element, or any combination of elements may be implemented with the processing system 614. The processing system 614 may include one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 600 may be configured to perform any one or more of the functions described herein. That is, the processor 604, as utilized in a UE 600, may be used to implement any one or more of the processes and procedures described herein.

The processor 604 may in some instances be implemented via a baseband or modem chip and in other implementations, the processor 604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610 and between the bus 602 and an interface 630. The transceiver 610 provides a communication interface or means for communicating with various other apparatus over a wireless transmission medium. In some examples, the UE may include two or more transceivers 610, each configured to communicate with a respective network type (e.g., terrestrial or non-terrestrial). The interface 630 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 630 may include a user interface (e.g., keypad, display, speaker, microphone, joystick). Of course, such a user interface is optional, and may be omitted in some examples, such as an IoT device.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software. For example, the memory 605 may store configuration information 615 (e.g., CSI-RS information) used by the processor 604 in cooperation with the transceiver 610 for communicating with a base station.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 600 may be configured to perform any one or more of the operations described herein (e.g., as described above in conjunction with FIGS. 1-5 and as described below in conjunction with FIGS. 7-10). In some aspects of the disclosure, the processor 604, as utilized in the UE 600, may include circuitry configured for various functions.

The processor 604 may include communication and processing circuitry 641. The communication and processing circuitry 641 may be configured to communicate with a base station, such as a gNB. The communication and processing circuitry 641 may include one or more hardware components that provide the physical structure that performs various processes related to wireless communication (e.g., signal reception and/or signal transmission) as described herein. The communication and processing circuitry 641 may further include one or more hardware components that provide the physical structure that performs various processes related to signal processing (e.g., processing a received signal and/or processing a signal for transmission) as described herein. In some examples, the communication and processing circuitry 641 may include two or more transmit/receive chains, each configured to process signals in a different RAT (or RAN) type. The communication and processing circuitry 641 may further be configured to execute communication and processing software 651 included on the computer-readable medium 606 to implement one or more functions described herein.

In some examples, the communication and processing circuitry 641 may be configured to receive and process downlink beamformed signals at a mmWave frequency or a sub-6 GHz frequency via the transceiver 610 and an antenna array. For example, the communication and processing circuitry 641 may be configured to receive a respective reference signal (e.g., SSB or CSI-RS) on each of a plurality of downlink beams from the base station during a downlink beam sweep via at least one first antenna panel of the antenna array 620. The communication and processing circuitry 641 may further be configured to transmit a beam measurement report to the base station.

In some examples, the communication and processing circuitry 641 may further be configured to generate and transmit uplink beamformed signals at a mmWave frequency or a sub-6 GHz frequency via the transceiver 610. For example, the communication and processing circuitry 641 may be configured to transmit a respective reference signal (e.g., SRS or DMRS) on each of a plurality of uplink beams to the base station during an uplink beam sweep via at least one second antenna panel of the antenna array 620.

The communication and processing circuitry 641 may further be configured to generate and transmit a request to the base station. For example, the request may be included in a MAC-CE carried in a PUSCH, UCI in a PUCCH or PUSCH, a random access message, or a radio resource control (RRC) message. The communication and processing circuitry 641 may further be configured to generate and transmit a scheduling request (e.g., via UCI in a PUCCH) to the base station to receive an uplink grant for the PUSCH carrying the MAC-CE including the request.

The communication and processing circuitry 641 may further be configured to generate and transmit an uplink signal on one or more uplink transmit beams applied to the uplink signal. The uplink signal may include, for example, a PUCCH, PUSCH, SRS, DMRS, or physical random access channel (PRACH).

The communication and processing circuitry 641 may further be configured to control the antenna array 620 and the transceiver 610 to search for and identify a plurality of downlink transmit beams during a downlink beam sweep. The communication and processing circuitry 641 may further be configured to obtain a plurality of beam measurements on each of a plurality of downlink receive beams via the antenna array 620 for each of the identified downlink transmit beams. The communication and processing circuitry 641 may further be configured to generate a beam measurement report for transmission to the base station using the communication and processing circuitry 641.

The communication and processing circuitry 641 may further be configured to identify one or more selected uplink beam(s) based on the beam measurements obtained from the downlink beam reference signals. In some examples, the communication and processing circuitry 641 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 641 may be configured to generate one or more uplink transmit beams for transmission in an uplink beam sweep. Each uplink transmit beam may carry an uplink reference signal (e.g., an SRS) for measurement by the base station. The communication and processing circuitry 641 may further be configured to identify the selected uplink transmit beam(s) selected by the base station based on the uplink beam measurements. For example, the communication and processing circuitry 641 may be configured to receive an indication of the selected uplink transmit beam(s) from the base station.

In some implementations where the communication involves receiving information, the communication and processing circuitry 641 may obtain information from a component of the UE 600 (e.g., from the transceiver 610 that receives the information via radio frequency signaling or some other type of signaling suitable for the applicable communication medium), process (e.g., decode) the information, and output the processed information. For example, the communication and processing circuitry 641 may output the information to another component of the processor 604, to the memory 605, or to the bus interface 608. In some examples, the communication and processing circuitry 641 may receive one or more of signals, messages, other information, or any combination thereof. In some examples, the communication and processing circuitry 641 may receive information via one or more channels. In some examples, the communication and processing circuitry 641 may include functionality for a means for receiving. In some examples, the communication and processing circuitry 641 may include functionality for a means for decoding.

In some implementations where the communication involves sending (e.g., transmitting) information, the communication and processing circuitry 641 may obtain information (e.g., from another component of the processor 604, the memory 605, or the bus interface 608), process (e.g., encode) the information, and output the processed information. For example, the communication and processing circuitry 641 may output the information to the transceiver 610 (e.g., that transmits the information via radio frequency signaling or some other type of signaling suitable for the applicable communication medium). In some examples, the communication and processing circuitry 641 may send one or more of signals, messages, other information, or any combination thereof. In some examples, the communication and processing circuitry 641 may send information via one or more channels. In some examples, the communication and processing circuitry 641 may include functionality for a means for sending (e.g., a means for transmitting). In some examples, the communication and processing circuitry 641 may include functionality for a means for encoding.

The processor 604 may include reference signal processing circuitry 642 configured to perform reference signal processing-related operations as discussed herein (e.g., one or more of the operations described in conjunction with FIGS. 4-5). In some examples, the reference signal processing circuitry 642 may include functionality for a means for receiving a CSI-RS configuration. In some examples, the reference signal processing circuitry 642 may include functionality for a means for receiving a CSI-RS. The reference signal processing circuitry 642 may further be configured to execute reference signal processing software 652 included on the computer-readable medium 606 to implement one or more functions described herein. In some examples, the reference signal processing circuitry 642 may monitor a specified resource (e.g., PDCCH or PDCCH) for an RRC message, a DCI, or some other signaling and parse the received signaling to obtain a CSI-RS configuration. In some examples, the reference signal processing circuitry 642 may monitor a designated resource (e.g., carrying DRS) and measure received signaling to obtain a CSI-RS.

The processor 604 may include report processing circuitry 643 configured to perform report processing-related operations as discussed herein (e.g., one or more of the operations described in conjunction with FIGS. 4-5). In some examples, the report processing circuitry 643 may include functionality for a means for generating a measurement report. In some examples, the report processing circuitry 643 may include functionality for a means for sending a measurement report. The report processing circuitry 643 may further be configured to execute report processing software 653 included on the computer-readable medium 606 to implement one or more functions described herein. In some examples, the report processing circuitry 643 may generate a report that includes an indication of the signal strength of a CSI-RS received from a particular base station and/or other measurement information. In some examples, the report processing circuitry 643 may encode and transmit the measurement report on a designated resource (e.g., PUSCH).

Figure 7:
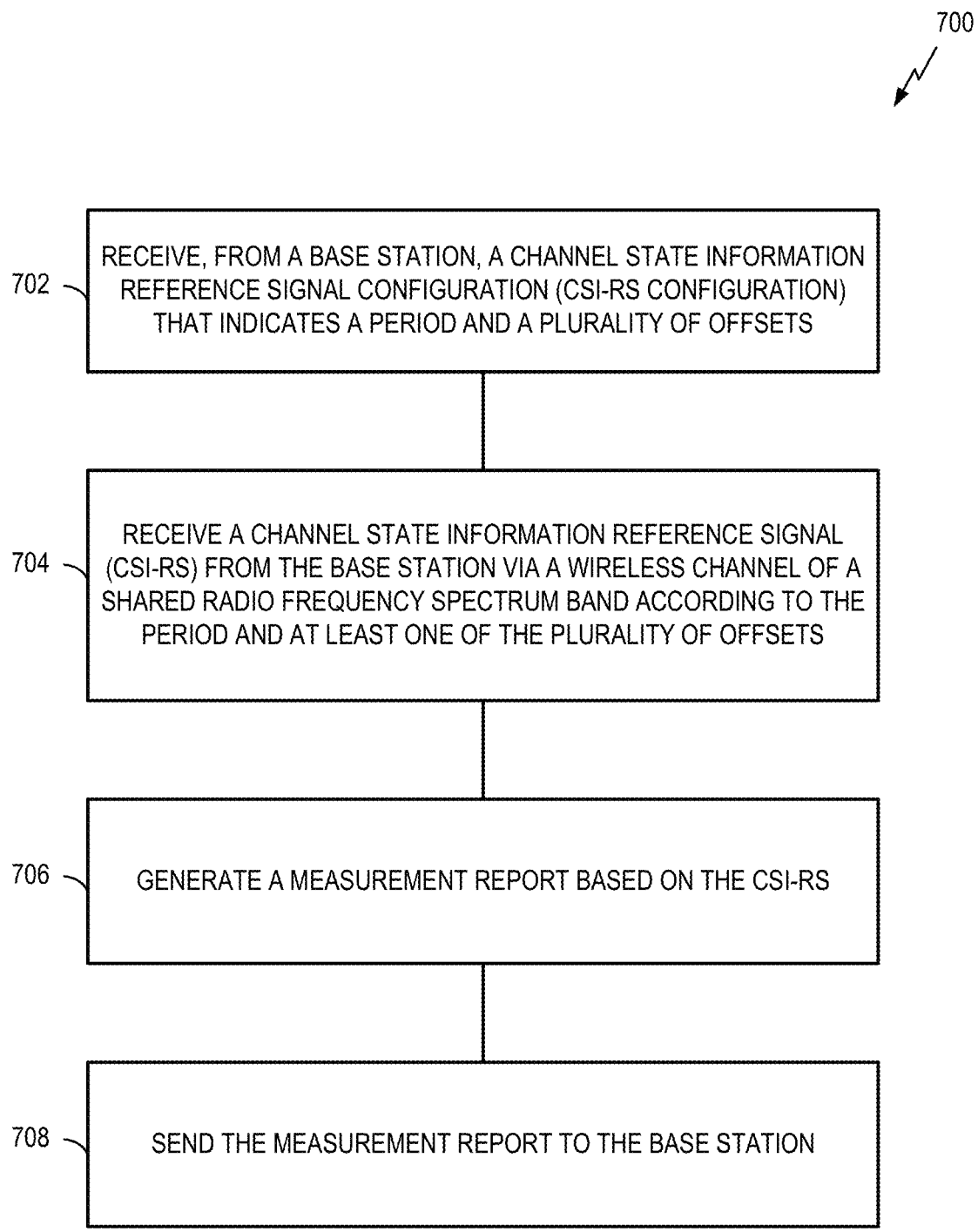
FIG. 7 is a flowchart illustrating an example of a method that includes signaling a CSI-RS configuration according to some aspects.

FIG. 7 is a flow chart illustrating an example wireless communication method 700 according to some aspects of the disclosure. As described herein, some or all illustrated features may be omitted in a particular implementation within the scope of the present disclosure, and some illustrated features may not be required for implementation of all examples. In some examples, the method 700 may be carried out by the UE 600 illustrated in FIG. 6. In some examples, the method 700 may be carried out by any suitable apparatus or means for carrying out the functions or algorithm described below.

At block 702, a UE receives, from a base station, a channel state information reference signal configuration (CSI-RS configuration) that indicates a period and a plurality of offsets. For example, the reference signal processing circuitry 642 together with the communication and processing circuitry 641 and the transceiver 610, shown and described above in connection with FIG. 6, may monitor a specified resource (e.g., PDSCH or PDCCH) for an RRC message, a DCI, or some other signaling and parse the received signaling to obtain a CSI-RS configuration, if applicable.

The CSI-RS configuration may take different forms in different examples. In some examples, the CSI-RS configuration may include a CSI-ResourcePeriodicityAndOffset parameter that indicates the period and the plurality of offsets. In some examples, the CSI-RS configuration may include a first CSI-ResourcePeriodicityAndOffset parameter that indicates the period and a first one of the plurality of offsets, and a second CSI-ResourcePeriodicityAndOffset parameter that indicates the period and a second one of the plurality of offsets. In some examples, a CSI-RS-Resource config parameter may include the first CSI-ResourcePeriodicityAndOffset parameter and the second CSI-ResourcePeriodicityAndOffset parameter. In some examples, the CSI-RS configuration may include a first CSI-ResourcePeriodicityAndOffset parameter that indicates a first period and a first one of the plurality of offsets, and a second CSI-ResourcePeriodicityAndOffset parameter that indicates a second period and a second one of the plurality of offsets, wherein the second period is different from the first period. In some examples, a CSI-RS-Resource config parameter may include the first CSI-ResourcePeriodicityAndOffset parameter and the second CSI-ResourcePeriodicityAndOffset parameter.

At block 704, the UE receives a channel state information reference signal (CSI-RS) from the base station via a wireless channel of a shared radio frequency spectrum band according to the period and at least one of the plurality of offsets. For example, the reference signal processing circuitry 642 together with the communication and processing circuitry 641 and the transceiver 610 may monitor a designated resource (e.g., carrying DRS) and measure the received signaling to obtain a CSI-RS, if applicable.

In some examples, the shared radio frequency spectrum band may include (e.g., may be) an unlicensed band. In some examples, receiving the CSI-RS may include receiving the CSI-RS multiplexed with a synchronization signal block (SSB). In some examples, receiving the CSI-RS may include receiving the CSI-RS multiplexed with a discovery reference signal (DRS). In some examples, receiving the CSI-RS configuration may include receiving the CSI-RS configuration via downlink control information or a physical broadcast channel message.

At block 706, the UE generates a measurement report based on the CSI-RS. In some examples, generating the measurement report may include generating the measurement report based on a measurement conducted using one of the plurality of offsets. For example, the report processing circuitry 643, shown and described above in connection with FIG. 6, may generate a report that includes an indication of the signal strength of a CSI-RS received from a particular base station and/or other measurement information.

At block 708, the UE sends the measurement report to the base station. For example, the report processing circuitry 643 together with the communication and processing circuitry 641 and the transceiver 610 may encode and transmit the measurement report on a designated resource (e.g., PUSCH).

In some examples, the method 700 may further include receiving downlink control information that may include a zero-power CSI-RS (ZP-CSI-RS) indicator. In some examples, the method 700 may further include rate matching into a resource associated with the ZP-CSI-RS indicator, wherein the resource corresponds to at least one of the plurality of offsets that was not used for transmission of the CSI-RS. In some examples, the method 700 may further include receiving an indication that at least one of the plurality of offsets was not used for transmission of the CSI-RS. In some examples, the method 700 may further include receiving a slot format indicator (SFI) that indicates that a first symbol corresponding to a first one of the plurality of offsets is designated as a flexible symbol. In some examples, the method 700 may further include canceling measurement of the first symbol as a result of receiving the SFI that indicates that the first symbol is designated as a flexible symbol. In some examples, a method in accordance with the teachings herein may include any combination of the above operations.

Figure 8:
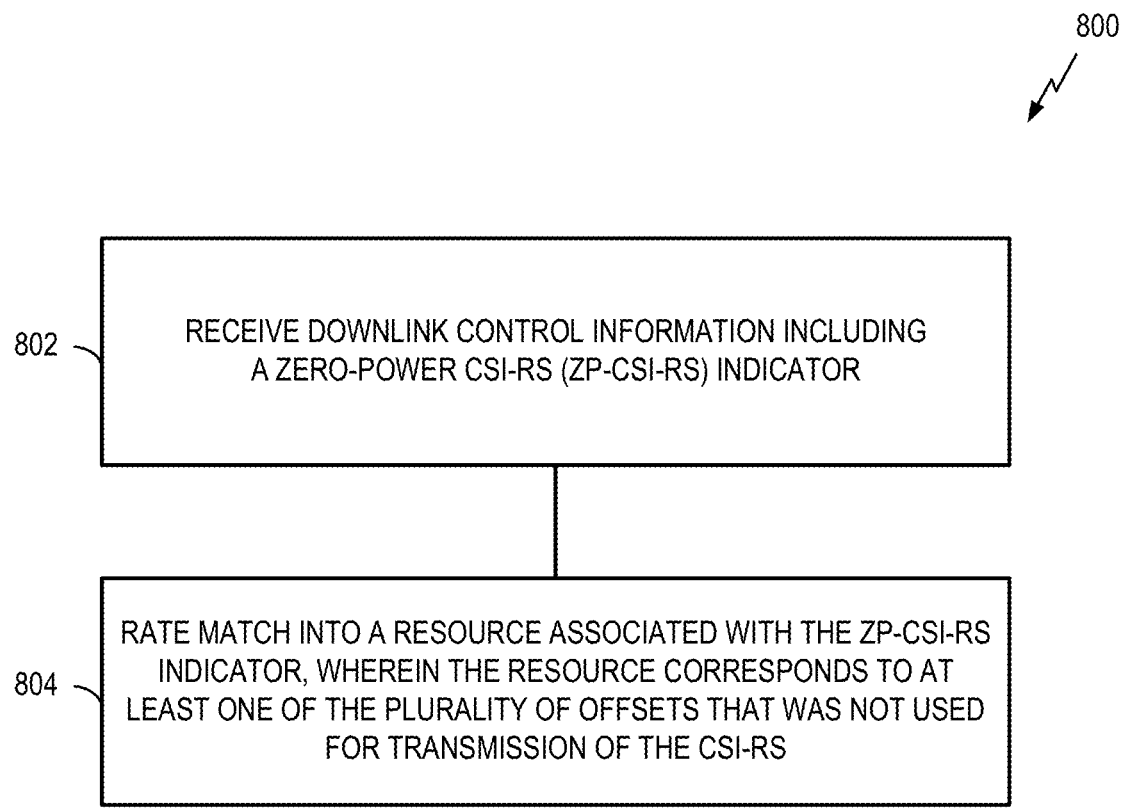
FIG. 8 is a flowchart illustrating an example of a method that includes rate matching according to some aspects.

FIG. 8 is a flow chart illustrating an example wireless communication method 800 according to some aspects of the disclosure. In some examples, the method 800 may be used in conjunction with (e.g., in addition to and/or as part of) the method 700 of FIG. 7. As described herein, some or all illustrated features may be omitted in a particular implementation within the scope of the present disclosure, and some illustrated features may not be required for implementation of all examples. In some examples, the method 800 may be carried out by the UE 600 illustrated in FIG. 6. In some examples, the method 800 may be carried out by any suitable apparatus or means for carrying out the functions or algorithm described below.

At block 802, a UE receives downlink control information including a zero-power CSI-RS (ZP-CSI-RS) indicator. For example, the reference signal processing circuitry 642 together with the communication and processing circuitry 641 and the transceiver 610, shown and described above in connection with FIG. 6, may monitor a specified resource (e.g., PDCCH) for a DCI and parse the received signaling to obtain the indicator, if applicable.

At block 804, the UE rate matches into a resource associated with the ZP-CSI-RS indicator, wherein the resource corresponds to at least one of the plurality of offsets that was not used for transmission of the CSI-RS. For example, the reference signal processing circuitry 642 may determine the number of bits for CSI-RS based on the indicator.

Figure 9:
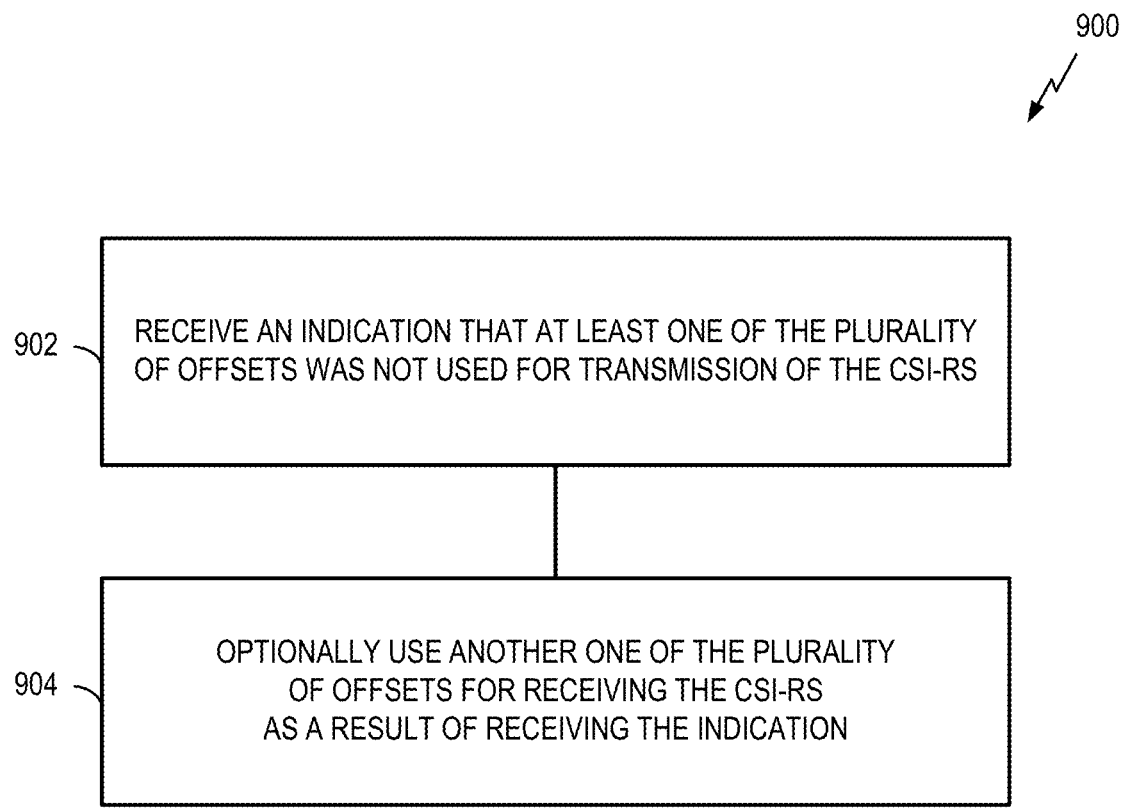
FIG. 9 is a flowchart illustrating an example of a method that includes using an offset according to some aspects.

FIG. 9 is a flow chart illustrating an example wireless communication method 900 according to some aspects of the disclosure. In some examples, the method 900 may be used in conjunction with (e.g., in addition to and/or as part of) the method 700 of FIG. 7. As described herein, some or all illustrated features may be omitted in a particular implementation within the scope of the present disclosure, and some illustrated features may not be required for implementation of all examples. In some examples, the method 900 may be carried out by the UE 600 illustrated in FIG. 6. In some examples, the method 900 may be carried out by any suitable apparatus or means for carrying out the functions or algorithm described below.

At block 902, a UE receives an indication that at least one of the plurality of offsets was not used for transmission of the CSI-RS. For example, the reference signal processing circuitry 642 together with the communication and processing circuitry 641 and the transceiver 610, shown and described above in connection with FIG. 6, may monitor a specified resource (e.g., PDCCH) for a DCI or other signaling and parse the received signaling to obtain the indication, if applicable.

At optional block 904, the UE may use another one of the plurality of offsets for receiving the CSI-RS as a result of receiving the indication. For example, the reference signal processing circuitry 642 together with the communication and processing circuitry 641 and the transceiver 610 may monitor a designated resource (according to the offset) and measure the received signaling to obtain a CSI-RS, if applicable.

Figure 10:
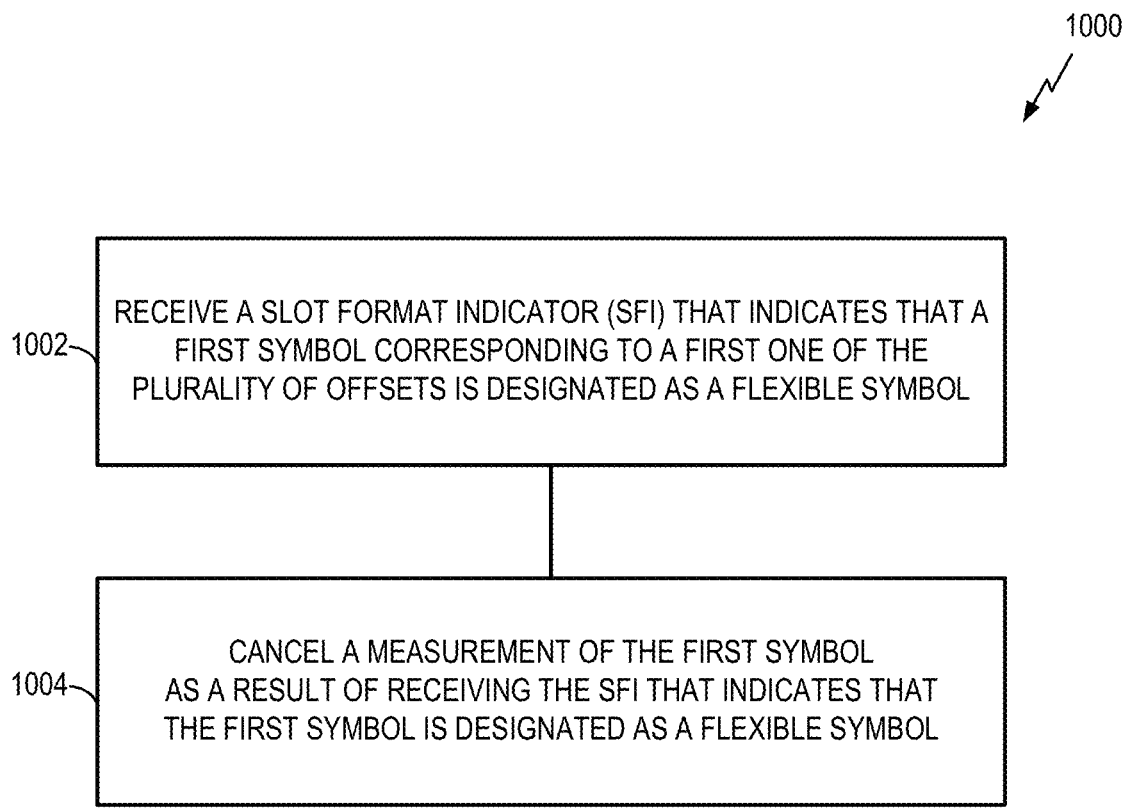
FIG. 10 is a flowchart illustrating an example of a method that includes canceling a measurement according to some aspects.

FIG. 10 is a flow chart illustrating an example wireless communication method 1000 according to some aspects of the disclosure. In some examples, the method 1000 may be used in conjunction with (e.g., in addition to and/or as part of) the method 700 of FIG. 7. As described herein, some or all illustrated features may be omitted in a particular implementation within the scope of the present disclosure, and some illustrated features may not be required for implementation of all examples. In some examples, the method 1000 may be carried out by the UE 600 illustrated in FIG. 6. In some examples, the method 1000 may be carried out by any suitable apparatus or means for carrying out the functions or algorithm described below.

At block 1002, a UE receives a slot format indicator (SFI) that indicates that a first symbol corresponding to a first one of the plurality of offsets is designated as a flexible symbol. For example, the reference signal processing circuitry 642 together with the communication and processing circuitry 641 and the transceiver 610, shown and described above in connection with FIG. 6, may monitor a specified resource (e.g., PDCCH or PDSCH) and parse the received signaling to obtain the SFI information, if applicable.

At block 1004, the UE cancels a measurement of the first symbol as a result of receiving the SFI that indicates that the first symbol is designated as a flexible symbol. For example, the reference signal processing circuitry 642 may abstain from monitoring for CSI-RS the first symbol after determining that the first symbol has been designated as a flexible symbol.

Figure 11:
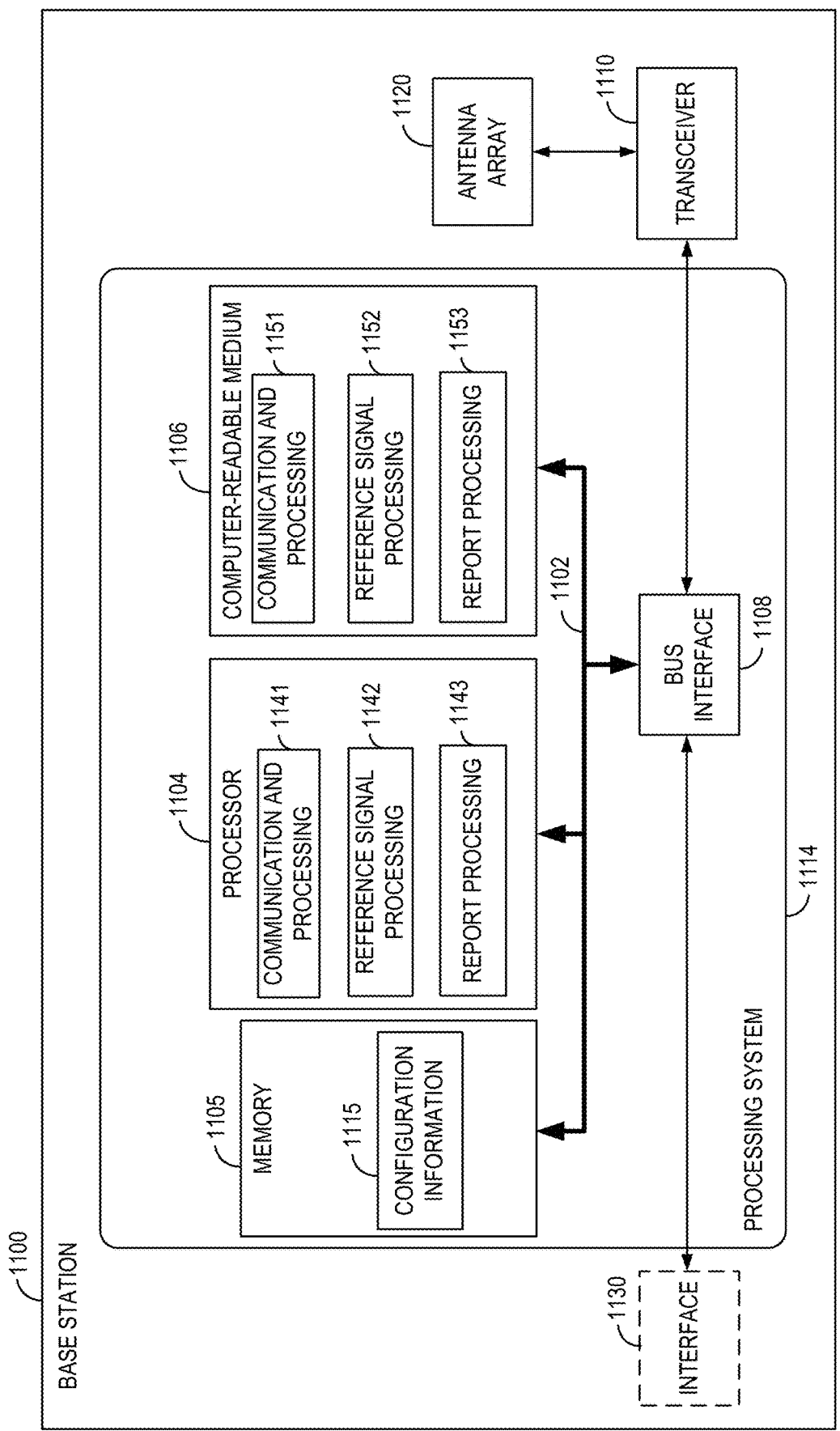
FIG. 11 is a block diagram illustrating an example of a hardware implementation for a base station employing a processing system according to some aspects.

FIG. 11 is a conceptual diagram illustrating an example of a hardware implementation for base station (BS) 1100 employing a processing system 1114. In some implementations, the BS 1100 may correspond to any of the BSs (e.g., gNBs) or scheduling entities shown in any of FIGS. 1, 2, and 5.

In accordance with various aspects of the disclosure, an element, or any portion of an element, or any combination of elements may be implemented with the processing system 1114. The processing system may include one or more processors 1104. The processing system 1114 may be substantially the same as the processing system 614 illustrated in FIG. 6, including a bus interface 1108, a bus 1102, memory 1105, a processor 1104, and a computer-readable medium 1106. The memory 1105 may store configuration information 1115 (e.g., CSI-RS information) for a UE. Furthermore, the BS 1100 may include an interface 1130 (e.g., a network interface) that provides a means for communicating with at least one other apparatus within a core network and with at least one radio access network.

The BS 1100 may be configured to perform any one or more of the operations described herein (e.g., as described above in conjunction with FIGS. 1-5 and as described below in conjunction with FIGS. 12-15). In some aspects of the disclosure, the processor 1104, as utilized in the BS 1100, may include circuitry configured for various functions.

The processor 1104 may be configured to generate, schedule, and modify a resource assignment or grant of time-frequency resources (e.g., a set of one or more resource elements). For example, the processor 1104 may schedule time-frequency resources within a plurality of time division duplex (TDD) and/or frequency division duplex (FDD) subframes, slots, and/or mini-slots to carry user data traffic and/or control information to and/or from multiple UEs.

The processor 1104 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1104 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1104 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1104 may be configured to schedule PUSCH resources for the uplink beam refinement request in response to receiving a scheduling request from the UE.

The processor 1104 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1104 may include communication and processing circuitry 1141. The communication and processing circuitry 1144 may be configured to communicate with a UE. The communication and processing circuitry 1141 may include one or more hardware components that provide the physical structure that performs various processes related to communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. The communication and processing circuitry 1141 may further be configured to execute communication and processing software 1151 included on the computer-readable medium 1106 to implement one or more functions described herein.

In some examples, the communication and processing circuitry 1141 may be configured to receive and process uplink beamformed signals at a mmWave frequency or a sub-6 GHz frequency via the transceiver 1110 and an antenna array. For example, the communication and processing circuitry 1141 may be configured to receive a respective reference signal (e.g., SRS or DMRS) on each of a plurality of uplink beams from the UE during an uplink beam sweep.

In some examples, the communication and processing circuitry 1141 may further be configured to generate and transmit downlink beamformed signals at a mmWave frequency or a sub-6 GHz frequency via the transceiver 1110 and the antenna array 1120. For example, the communication and processing circuitry 1141 may be configured to transmit a respective downlink reference signal (e.g., SSB or CSI-RS) on each of a plurality of downlink beams to the UE during a downlink beam sweep via at least one first antenna panel of the antenna array 1120. The communication and processing circuitry 1141 may further be configured to receive a beam measurement report from the UE.

The communication and processing circuitry 1141 may further be configured to receive a request from the UE. For example, the request may be included in a MAC-CE carried in a PUSCH, UCI in a PUCCH or PUSCH, a random access message, or an RRC message. The communication and processing circuitry 1141 may further be configured to receive a scheduling request (e.g., via UCI in a PUCCH) from the UE for an uplink grant for the PUSCH.

The communication and processing circuitry 1141 may further be configured to receive an uplink signal on one or more uplink receive beams via one or more uplink transmit beams applied to the uplink signal. For example, the communication and processing circuitry 1141 may be configured to receive the uplink signal on one or more uplink receive beams. The uplink signal may include, for example, a PUCCH, PUSCH, SRS, DMRS, or PRACH.

The communication and processing circuitry 1141 may further be configured to control the antenna array 1120 and transceiver 1110 to generate a plurality of downlink transmit beams during a downlink beam sweep. The communication and processing circuitry 1141 may further be configured to receive a beam measurement report from the UE using the communication and processing circuitry 1144. The communication and processing circuitry 1141 may further be configured to identify one or more selected uplink beam(s) based on the beam measurements. In some examples, the communication and processing circuitry 1141 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams Each serving downlink receive beam may have the highest measured RSRP (or other beam measurement) for one of the downlink transmit beams.

The communication and processing circuitry 1141 may be configured to receive one or more uplink transmit beams in an uplink beam sweep. Each uplink transmit beam may carry an uplink reference signal (e.g., an SRS) for measurement by the communication and processing circuitry 1141. The communication and processing circuitry 1141 may further be configured to obtain a plurality of beam measurements on each of a plurality of uplink receive beams for each of the uplink transmit beams. The communication and processing circuitry 1141 may further be configured to select the selected uplink transmit beam(s) and corresponding uplink receive beams forming respective uplink BPLs based on the uplink beam measurements.

In some implementations wherein the communication involves receiving information, the communication and processing circuitry 1141 may obtain information from a component of the BS 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for decoding.

In some implementations wherein the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for encoding.

The processor 1104 may include reference signal processing circuitry 1142 configured to perform reference signal processing-related operations as discussed herein (e.g., one or more of the operations described in conjunction with FIGS. 4-5). In some examples, the reference signal processing circuitry 1142 may include functionality for a means for sending a CSI-configuration. In some examples, the reference signal processing circuitry 1142 may include functionality for a means for sending a CSI-RS. The reference signal processing circuitry 1142 may further be configured to execute reference signal processing software 1152 included on the computer-readable medium 1106 to implement one or more functions described herein. In some examples, the reference signal processing circuitry 1142 may generate a CSI-RS configuration indicating resources to be used for a CSI-RS transmission. In some examples, the reference signal processing circuitry 1142 may send the CSI-RS configuration on a specified resource (e.g., PDCCH, PDCCH, etc.) via an RRC message, a DCI, or some other signaling. In some examples, the reference signal processing circuitry 1142 may send a CSI-RS on a designated resource (e.g., carrying DRS).

The processor 1104 may include report processing circuitry 1143 configured to perform report processing-related operations as discussed herein (e.g., one or more of the operations described in conjunction with FIGS. 4-5). In some examples, the report processing circuitry 1143 may include functionality for a means for receiving a measurement report. The report processing circuitry 1143 may further be configured to execute report processing software 1153 included on the computer-readable medium 1106 to implement one or more functions described herein. In some examples, the report processing circuitry 1143 may monitor a designated resource (e.g., PUSCH) for signaling from a UE. In some examples, the report processing circuitry 1143 may decode received signaling to obtain a measurement report from a UE. In some examples, the report processing circuitry 1143 may parse the measurement report to obtain measurement information (e.g., indicative of a channel between the UE and the BS 1100).

Figure 12:
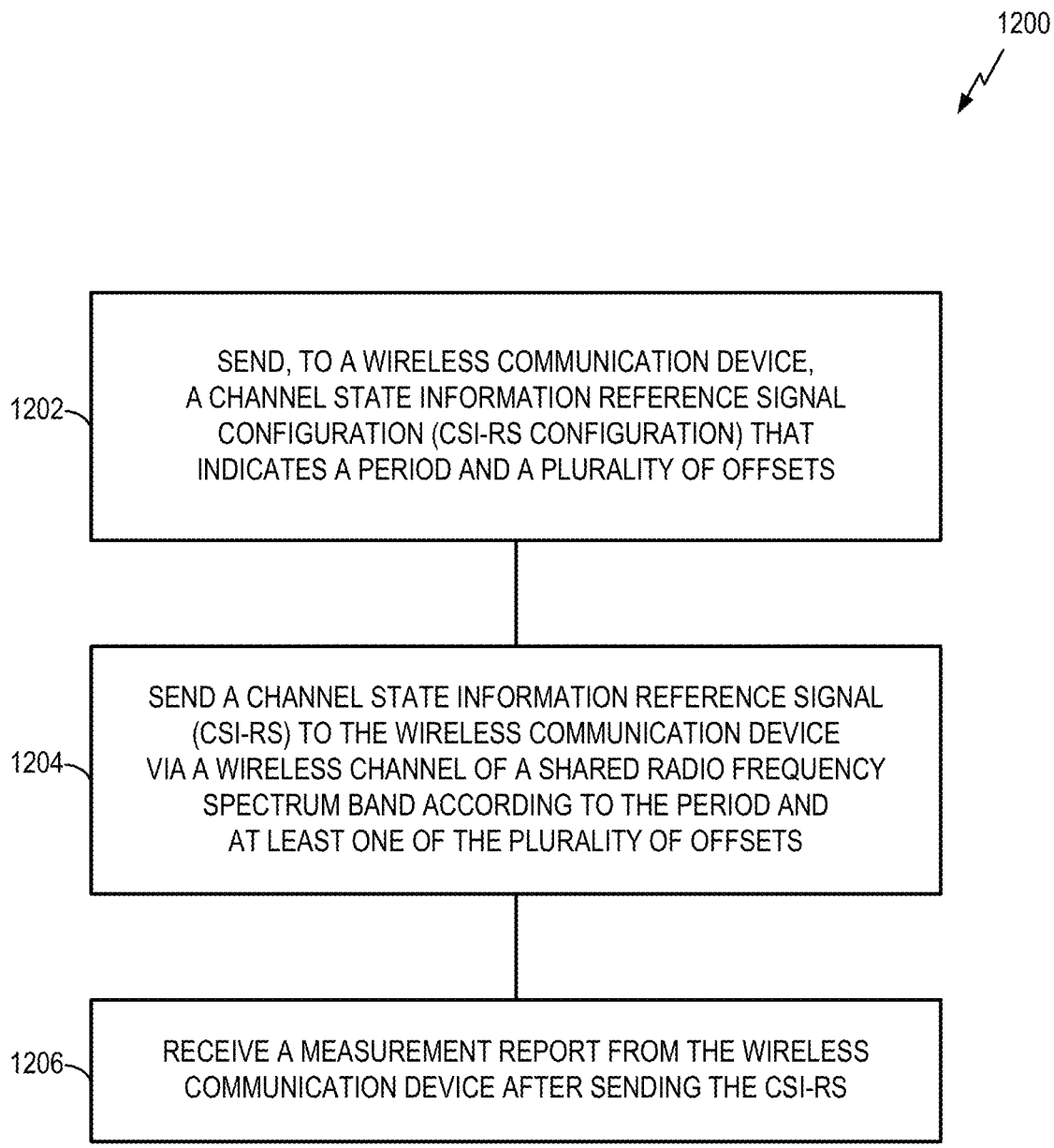
FIG. 12 is a flowchart illustrating an example of a method that includes signaling a CSI-RS configuration according to some aspects.

FIG. 12 is a flow chart illustrating an example wireless communication method 1200 according to some aspects of the disclosure. As described herein, some or all illustrated features may be omitted in a particular implementation within the scope of the present disclosure, and some illustrated features may not be required for implementation of all examples. In some examples, the method 1200 may be carried out by the BS 1100 illustrated in FIG. 11. In some examples, the method 1200 may be carried out by any suitable apparatus or means for carrying out the functions or algorithm described below.

At block 1202, a BS sends, to a user equipment, a channel state information reference signal configuration (CSI-RS configuration) that indicates a period and a plurality of offsets. For example, the reference signal processing circuitry 1142, shown and described above in connection with FIG. 11, may generate a CSI-RS configuration indicating resources to be used for a CSI-RS transmission. In addition, the reference signal processing circuitry 1142 together with the communication and processing circuitry 1141 and the transceiver 1110, shown and described above in connection with FIG. 11, may transmit the CSI-RS configuration on a specified resource (e.g., PDCCH, PDCCH, etc.) via an RRC message, a DCI, or some other signaling.

The CSI-RS configuration may take different forms in different examples. In some examples, the CSI-RS configuration may include a CSI-ResourcePeriodicityAndOffset parameter that indicates the period and the plurality of offsets. In some examples, the CSI-RS configuration may include a first CSI-ResourcePeriodicityAndOffset parameter that indicates the period and a first one of the plurality of offsets, and a second CSI-ResourcePeriodicityAndOffset parameter that indicates the period and a second one of the plurality of offsets. In some examples, a CSI-RS-Resource config parameter may include the first CSI-ResourcePeriodicityAndOffset parameter and the second CSI-ResourcePeriodicityAndOffset parameter. In some examples, the CSI-RS configuration may include, a first CSI-ResourcePeriodicityAndOffset parameter that indicates a first period and a first one of the plurality of offsets, and a second CSI-ResourcePeriodicityAndOffset parameter that indicates a second period and a second one of the plurality of offsets, wherein the second period is different from the first period. In some examples, a CSI-RS-Resource config parameter may include the first CSI-ResourcePeriodicityAndOffset parameter and the second CSI-ResourcePeriodicityAndOffset parameter.

At block 1204, the BS sends a channel state information reference signal (CSI-RS) to the user equipment via a wireless channel of a shared radio frequency spectrum band according to the period and at least one of the plurality of offsets. For example, the reference signal processing circuitry 1142 together with the communication and processing circuitry 1141 and the transceiver 1110 may transmit the CSI-RS on a designated resource (e.g., carrying DRS).

In some examples, the shared radio frequency spectrum band may include (e.g., may be) an unlicensed band. In some examples, sending the CSI-RS may include sending the CSI-RS multiplexed with a synchronization signal block (SSB). In some examples, sending the CSI-RS may include sending the CSI-RS multiplexed with a discovery reference signal (DRS). In some examples, sending the CSI-RS configuration may include sending the CSI-RS configuration via downlink control information or a physical broadcast channel message.

At block 1206, the BS receives a measurement report from the user equipment after sending the CSI-RS. In some examples, the measurement report may be based on a measurement conducted using one of the plurality of offsets. For example, the report processing circuitry 1143 together with the communication and processing circuitry 1141 and the transceiver 1110, shown and described above in connection with FIG. 11, may monitor a designated resource (e.g., PUSCH) and parse received signaling to obtain the measurement report from a UE, if applicable.

In some examples, the method 1200 may further include determining at least one communication parameter for communicating with the user equipment based on the measurement report.

In some examples, the method 1200 may further include sending downlink control information including a zero-power CSI-RS (ZP-CSI-RS) indicator, wherein the ZP-CSI-RS indicator corresponds to a resource allocated for at least one of the plurality of offsets that was not used for transmission of the CSI-RS. In some examples, the method 1200 may further include sending to the user equipment an indication that at least one of the plurality of offsets was not used for transmission of the CSI-RS. In some examples, the method 1200 may further include sending a slot format indicator (SFI) that indicates that a first symbol corresponding to a first one of the plurality of offsets is designated as a flexible symbol, wherein the first symbol corresponds to at least one of the plurality of offsets that was not used for transmission of the CSI-RS. In some examples, a method in accordance with the teachings herein may include any combination of the above operations.

Figure 13:
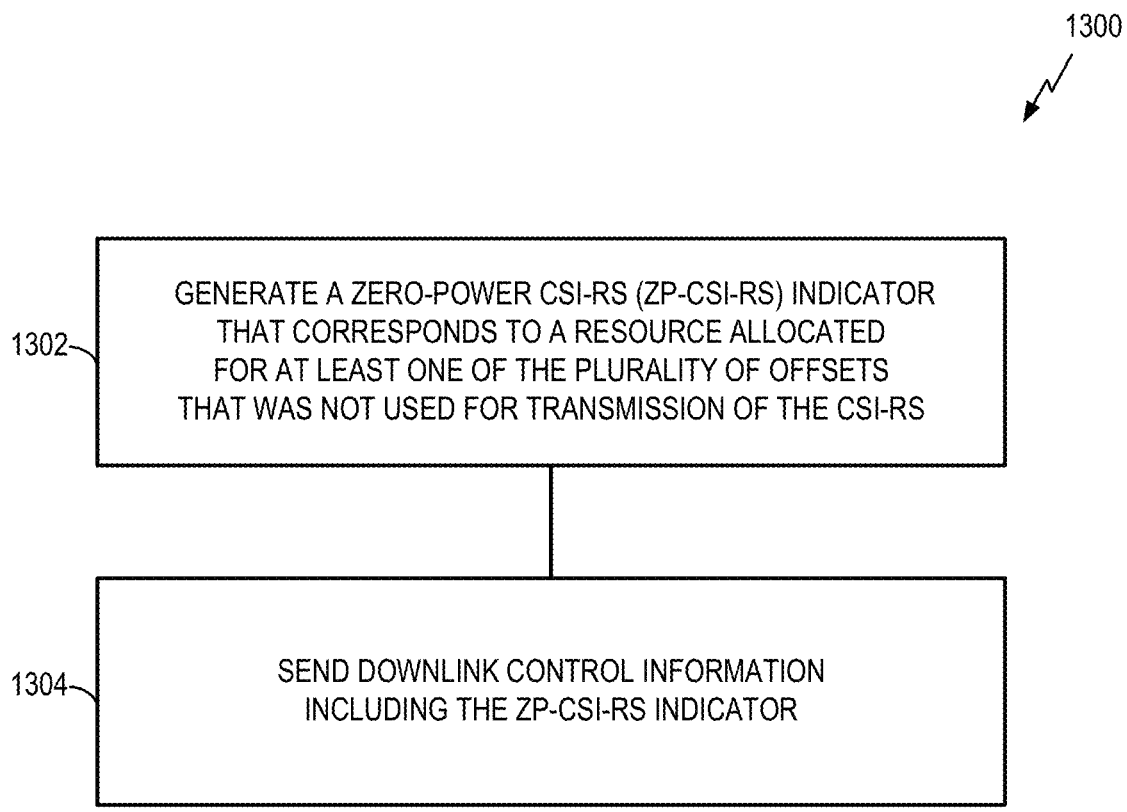
FIG. 13 is a flowchart illustrating an example of a method that includes signaling a zero-power CSI-RS indicator according to some aspects.

FIG. 13 is a flow chart illustrating an example wireless communication method 1300 according to some aspects of the disclosure. In some examples, the method 1300 may be used in conjunction with (e.g., in addition to and/or as part of) the method 1200 of FIG. 12. As described herein, some or all illustrated features may be omitted in a particular implementation within the scope of the present disclosure, and some illustrated features may not be required for implementation of all examples. In some examples, the method 1300 may be carried out by the BS 1100 illustrated in FIG. 11. In some examples, the method 1300 may be carried out by any suitable apparatus or means for carrying out the functions or algorithm described below.

At block 1302, a BS generates a zero-power CSI-RS (ZP-CSI-RS) indicator that corresponds to a resource allocated for at least one of the plurality of offsets that was not used for transmission of the CSI-RS. For example, the reference signal processing circuitry 1142, shown and described above in connection with FIG. 11, may generate a ZP-CSI-RS indicator indicating resources not being used for a CSI-RS transmission.

At block 1304, the BS sends (e.g., transmits) downlink control information including the ZP-CSI-RS indicator. For example, the reference signal processing circuitry 1142 together with the communication and processing circuitry 1141 and the transceiver 1110, shown and described above in connection with FIG. 11, may transmit the ZP-CSI-RS indicator on a specified resource (e.g., PDCCH, PDCCH, etc.) via an RRC message, a DCI, or some other signaling.

Figure 14:
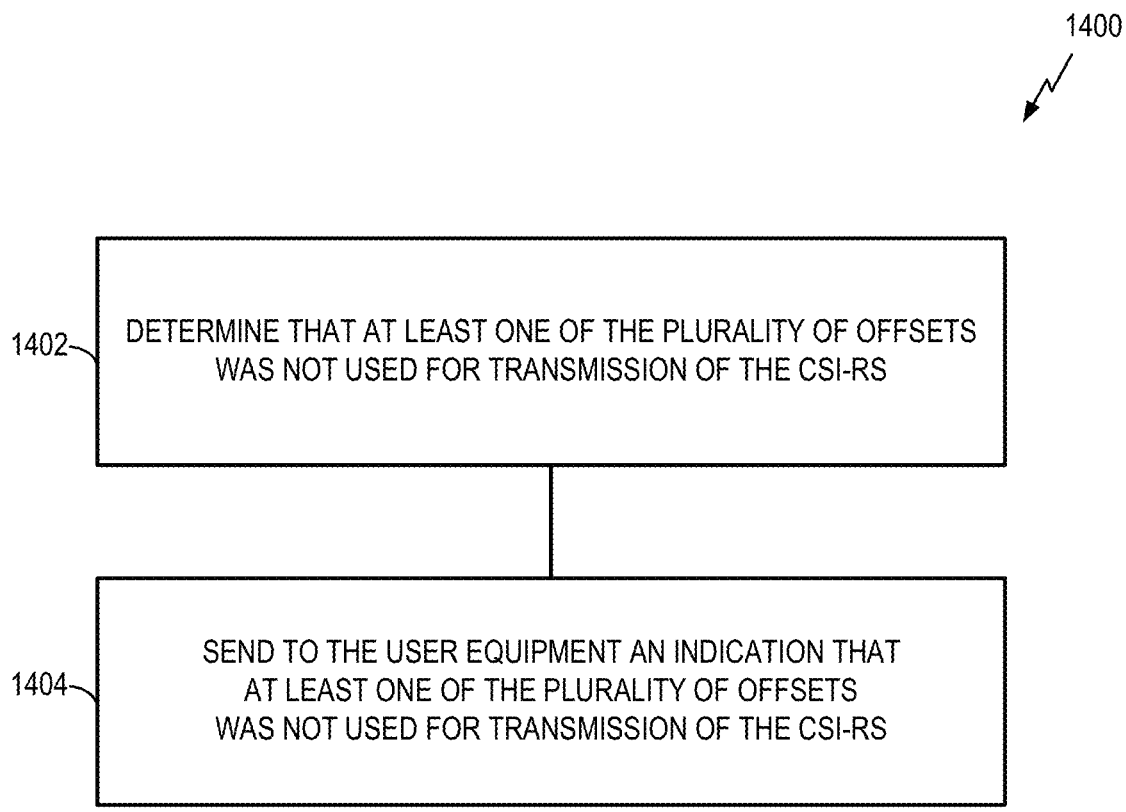
FIG. 14 is a flowchart illustrating an example of a method that includes indicating that an offset was not used according to some aspects.

FIG. 14 is a flow chart illustrating an example wireless communication method 1400 according to some aspects of the disclosure. In some examples, the method 1400 may be used in conjunction with (e.g., in addition to and/or as part of) the method 1200 of FIG. 12. As described herein, some or all illustrated features may be omitted in a particular implementation within the scope of the present disclosure, and some illustrated features may not be required for implementation of all examples. In some examples, the method 1400 may be carried out by the BS 1100 illustrated in FIG. 11. In some examples, the method 1400 may be carried out by any suitable apparatus or means for carrying out the functions or algorithm described below.

At block 1402, a BS determines that at least one of the plurality of offsets was not used for transmission of the CSI-RS. For example, the reference signal processing circuitry 1142, shown and described above in connection with FIG. 11, may determine that an LBT procedure failed when using at least one of the offsets.

At block 1404, the BS sends (e.g., transmits) to the user equipment an indication that at least one of the plurality of offsets was not used for transmission of the CSI-RS. For example, the reference signal processing circuitry 1142, shown and described above in connection with FIG. 11, may generate a message including an indication of the offset(s)

that were not used for a CSI-RS transmission. In addition, the reference signal processing circuitry 1142 together with the communication and processing circuitry 1141 and the transceiver 1110, shown and described above in connection with FIG. 11, may transmit the message on a specified resource (e.g., PDSCH, PDCCH, etc.) via an RRC message, a DCI, or some other signaling.

Figure 15:
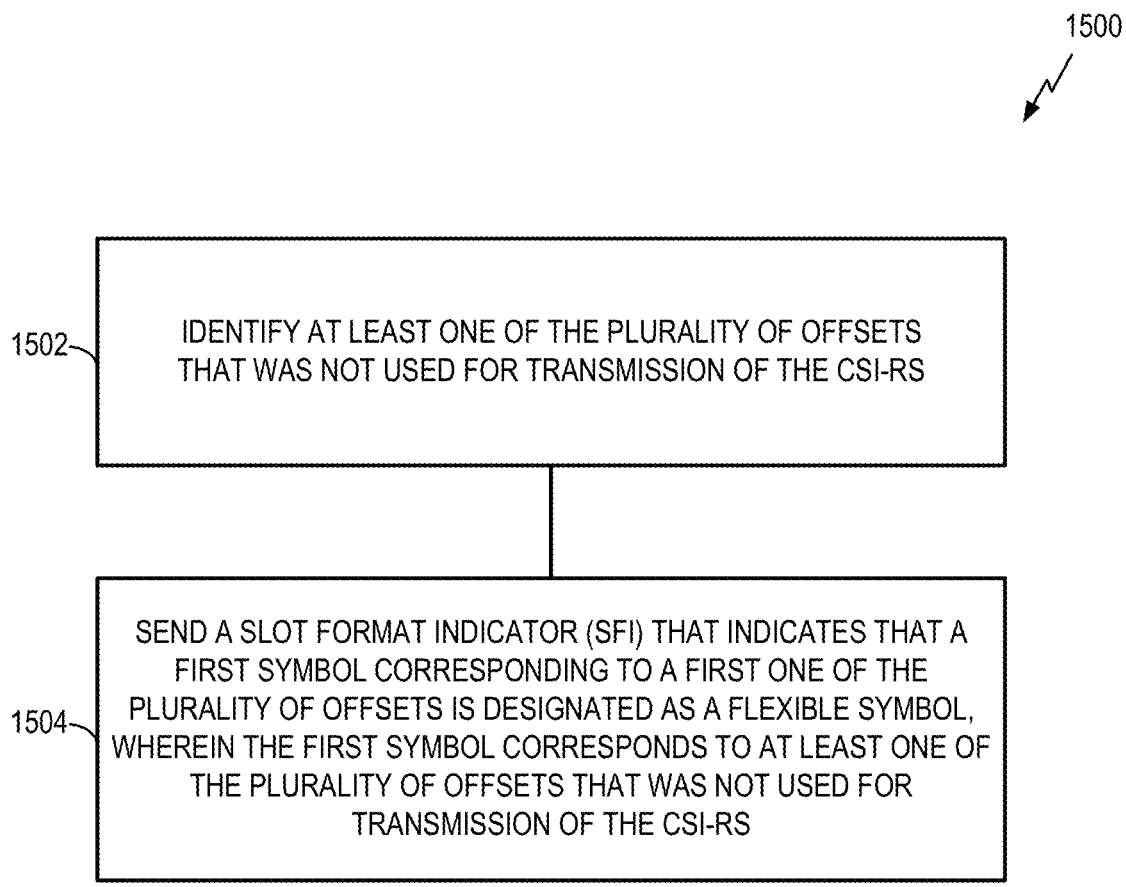
FIG. 15 is a flowchart illustrating an example of a method that includes signaling a slot format indicator according to some aspects.

FIG. 15 is a flow chart illustrating an example wireless communication method 1500 according to some aspects of the disclosure. In some examples, the method 1500 may be used in conjunction with (e.g., in addition to and/or as part of) the method 1200 of FIG. 12. As described herein, some or all illustrated features may be omitted in a particular implementation within the scope of the present disclosure, and some illustrated features may not be required for implementation of all examples. In some examples, the method 1500 may be carried out by the BS 1100 illustrated in FIG. 11. In some examples, the method 1500 may be carried out by any suitable apparatus or means for carrying out the functions or algorithm described below.

At block 1502, a BS identifies at least one of the plurality of offsets that was not used for transmission of the CSI-RS. For example, the reference signal processing circuitry 1142, shown and described above in connection with FIG. 11, may determine that an LBT procedure failed when using at least one of the offsets.

At block 1504, the BS sends (e.g., transmits) a slot format indicator (SFI) that indicates that a first symbol corresponding to a first one of the plurality of offsets is designated as a flexible symbol, wherein the first symbol corresponds to at least one of the plurality of offsets that was not used for transmission of the CSI-RS. For example, the reference signal processing circuitry 1142 together with the communication and processing circuitry 1141 and the transceiver 1110, shown and described above in connection with FIG. 11, may generate and transmit an SFI on a specified resource (e.g., PDSCH, PDCCH, etc.), where the SFI includes an indication of at least one offset that was not used for transmitting a CSI-RS.

The following provides an overview of several aspects of the present disclosure.

Aspect 1: A method for wireless communication at a user equipment, the method comprising: receiving, from a base station, a channel state information reference signal configuration (CSI-RS configuration) that indicates a period and a plurality of offsets; receiving a channel state information reference signal (CSI-RS) from the base station via a wireless channel of a shared radio frequency spectrum band according to the period and at least one of the plurality of offsets; generating a measurement report based on the CSI-RS; and sending the measurement report to the base station.

Aspect 2: The method of aspect 1, wherein the CSI-RS configuration comprises a CSI-ResourcePeriodicityAndOffset parameter that indicates the period and the plurality of offsets.

Aspect 3: The method of aspect 1 or 2, wherein the CSI-RS configuration comprises: a first CSI-ResourcePeriodicityAndOffset parameter that indicates the period and a first one of the plurality of offsets; and a second CSI-ResourcePeriodicityAndOffset parameter that indicates the period and a second one of the plurality of offsets.

Aspect 4: The method of aspect 3, wherein a CSI-RS-Resource config parameter comprises the first CSI-ResourcePeriodicityAndOffset parameter and the second CSI-ResourcePeriodicityAndOffset parameter.

Aspect 5: The method of any of aspects 1 through 4, wherein the CSI-RS configuration comprises: a first CSI-ResourcePeriodicityAndOffset parameter that indicates a first period and a first one of the plurality of offsets; and a second CSI-ResourcePeriodicityAndOffset parameter that indicates a second period and a second one of the plurality of offsets, wherein the second period is different from the first period.

Aspect 6: The method of aspect 5, wherein a CSI-RS-Resource config parameter comprises the first CSI-ResourcePeriodicityAndOffset parameter and the second CSI-ResourcePeriodicityAndOffset parameter.

Aspect 7: The method of any of aspects 1 through 6, wherein generating the measurement report comprises generating the measurement report based on a measurement conducted using one of the plurality of offsets.

Aspect 8: The method of any of aspects 1 through 7, further comprising: receiving downlink control information comprising a zero-power CSI-RS (ZP-CSI-RS) indicator; and rate matching into a resource associated with the ZP-CSI-RS indicator, wherein the resource corresponds to at least one of the plurality of offsets that was not used for transmission of the CSI-RS.

Aspect 9: The method of any of aspects 1 through 8, further comprising: receiving an indication that at least one of the plurality of offsets was not used for transmission of the CSI-RS.

Aspect 10: The method of any of aspects 1 through 9, further comprising: receiving a slot format indicator (SFI) that indicates that a first symbol corresponding to a first one of the plurality of offsets is designated as a flexible symbol; and canceling a measurement of the first symbol as a result of receiving the SFI that indicates that the first symbol is designated as a flexible symbol.

Aspect 11: The method of any of aspects 1 through 10, wherein receiving the CSI-RS comprises receiving the CSI-RS multiplexed with a synchronization signal block (SSB).

Aspect 12: The method of any of aspects 1 through 11, wherein receiving the CSI-RS comprises receiving the CSI-RS multiplexed with a discovery reference signal (DRS).

Aspect 13: The method of any of aspects 1 through 12, wherein receiving the CSI-RS configuration comprises receiving the CSI-RS configuration via downlink control information or a physical broadcast channel message.

Aspect 16: A method for wireless communication at a base station, the method comprising: sending, to a user equipment, a channel state information reference signal configuration (CSI-RS configuration) that indicates a period and a plurality of offsets; sending a channel state information reference signal (CSI-RS) to the user equipment via a wireless channel of a shared radio frequency spectrum band according to the period and at least one of the plurality of offsets; and receiving a measurement report from the user equipment after sending the CSI-RS.

Aspect 17: The method of aspect 16, wherein the CSI-RS configuration comprises a CSI-ResourcePeriodicityAndOffset parameter that indicates the period and the plurality of offsets.

Aspect 18: The method of any of aspects 16 through 17, wherein the CSI-RS configuration comprises: a first CSI-ResourcePeriodicityAndOffset parameter that indicates the period and a first one of the plurality of offsets; and a second CSI-ResourcePeriodicityAndOffset parameter that indicates the period and a second one of the plurality of offsets.

Aspect 19: The method of aspect 18, wherein a CSI-RS-Resource config parameter comprises the first CSI-ResourcePeriodicityAndOffset parameter and the second CSI-ResourcePeriodicityAndOffset parameter.

Aspect 20: The method of any of aspects 16 through 19, wherein the CSI-RS configuration comprises: a first CSI-ResourcePeriodicityAndOffset parameter that indicates a first period and a first one of the plurality of offsets; and a second CSI-ResourcePeriodicityAndOffset parameter that indicates a second period and a second one of the plurality of offsets, wherein the second period is different from the first period.

Aspect 21: The method of aspect 20, wherein a CSI-RS-Resource config parameter comprises the first CSI-ResourcePeriodicityAndOffset parameter and the second CSI-ResourcePeriodicityAndOffset parameter.

Aspect 22: The method of any of aspects 16 through 21, wherein the measurement report is based on a measurement conducted using one of the plurality of offsets.

Aspect 23: The method of any of aspects 16 through 22, further comprising: sending downlink control information comprising a zero-power CSI-RS (ZP-CSI-RS) indicator, wherein the ZP-CSI-RS indicator corresponds to a resource allocated for at least one of the plurality of offsets that was not used for transmission of the CSI-RS.

Aspect 24: The method of any of aspects 16 through 23, further comprising: sending to the user equipment an indication that at least one of the plurality of offsets was not used for transmission of the CSI-RS.

Aspect 25: The method of any of aspects 16 through 24, further comprising: sending a slot format indicator (SFI) that indicates that a first symbol corresponding to a first one of the plurality of offsets is designated as a flexible symbol, wherein the first symbol corresponds to at least one of the plurality of offsets that was not used for transmission of the CSI-RS.

Aspect 26: The method of any of aspects 16 through 25, wherein sending the CSI-RS comprises sending the CSI-RS multiplexed with a synchronization signal block (SSB).

Aspect 27: The method of any of aspects 16 through 26, wherein sending the CSI-RS comprises sending the CSI-RS multiplexed with a discovery reference signal (DRS).

Aspect 28: The method of any of aspects 16 through 27, wherein sending the CSI-RS configuration comprises sending the CSI-RS configuration via downlink control information or a physical broadcast channel message.

Aspect 29: The method of any of aspects 16 through 28, further comprising: determining at least one communication parameter for communicating with the user equipment based on the measurement report.

Aspect 30: A user equipment (UE) comprising: a transceiver configured to communicate with a radio access network, a memory, and a processor communicatively coupled to the transceiver and the memory, wherein the processor and the memory are configured to perform any one of aspects 1 through 13.

Aspect 31: An apparatus configured for wireless communication comprising at least one means for performing any one of aspects 1 through 13.

Aspect 32: A non-transitory computer-readable medium storing computer-executable code, comprising code for causing an apparatus to perform any one of aspects 1 through 13.

Aspect 33: A base station (BS) comprising: a transceiver, a memory, and a processor communicatively coupled to the transceiver and the memory, wherein the processor and the memory are configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 5, 6, and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a user equipment, the method comprising:
    receiving, from a base station, a channel state information reference signal configuration (CSI-RS configuration) that indicates a period and a plurality of offsets, wherein the period and the plurality of offsets are associated with a channel state information reference signal (CSI-RS) transmission;
    receiving the CSI-RS transmission from the base station via a wireless channel of a shared radio frequency spectrum band according to the period and at least one of the plurality of offsets;
    receiving an indication that one or more of the plurality of offsets was not used for the CSI-RS transmission; and
    transmitting, to the base station, a measurement report based on the CSI-RS transmission.

2. The method of claim 1, wherein the CSI-RS configuration comprises a CSI-ResourcePeriodicityAndOffset parameter that indicates the period and the plurality of offsets.

3. The method of claim 1, wherein the CSI-RS configuration comprises:
    a first CSI-ResourcePeriodicityAndOffset parameter that indicates the period and a first one of the plurality of offsets; and
    a second CSI-ResourcePeriodicityAndOffset parameter that indicates the period and a second one of the plurality of offsets.

4. The method of claim 3, wherein a CSI-RS-Resource config parameter comprises the first CSI-ResourcePeriodicityAndOffset parameter and the second CSI-ResourcePeriodicityAndOffset parameter.

5. The method of claim 1, wherein the CSI-RS configuration comprises:
    a first CSI-ResourcePeriodicityAndOffset parameter that indicates a first period and a first one of the plurality of offsets; and
    a second CSI-ResourcePeriodicityAndOffset parameter that indicates a second period and a second one of the plurality of offsets, wherein the second period is different from the first period.

6. The method of claim 5, wherein a CSI-RS-Resource config parameter comprises the first CSI-ResourcePeriodicityAndOffset parameter and the second CSI-ResourcePeriodicityAndOffset parameter.

7. The method of claim 1, further comprising:
    generating the measurement report based on a measurement conducted using one of the plurality of offsets.

8. The method of claim 1, further comprising:
    receiving downlink control information comprising a zero-power CSI-RS (ZP-CSI-RS) indicator; and
    rate matching into a resource associated with the ZP-CSI-RS indicator, wherein the resource corresponds to the one or more of the plurality of offsets that was not used for transmission of the CSI-RS.

9. The method of claim 1, further comprising:
    receiving a slot format indicator (SFI) that indicates that a first symbol corresponding to a first one of the plurality of offsets is designated as a flexible symbol; and
    canceling a measurement of the first symbol as a result of receiving the SFI that indicates that the first symbol is designated as a flexible symbol.

10. The method of claim 1, wherein receiving the CSI-RS transmission comprises receiving a CSI-RS multiplexed with a synchronization signal block (SSB).

11. The method of claim 1, wherein receiving the CSI-RS transmission comprises receiving a CSI-RS multiplexed with a discovery reference signal (DRS).

12. The method of claim 1, wherein receiving the CSI-RS configuration comprises receiving the CSI-RS configuration via downlink control information or a physical broadcast channel message.

13. A user equipment, comprising:
    a transceiver;
    one or more memories storing processor-executable code; and
    one or more processors configured to execute the processor-executable code to cause the user equipment to:
        receive, from a base station via the transceiver, a channel state information reference signal configuration (CSI-RS configuration) that indicates a period and a plurality of offsets, wherein the period and the plurality of offsets are associated with a channel state information reference signal (CSI-RS) transmission;
        receive the CSI-RS transmission from the base station via the transceiver and a wireless channel of a shared radio frequency spectrum band according to the period and at least one of the plurality of offsets;
        receive, via the transceiver, an indication that one or more of the plurality of offsets was not used for the CSI-RS transmission; and transmit, to the base station via the transceiver, a measurement report based on the CSI-RS transmission.

14. The user equipment of claim 13, wherein the CSI-RS configuration comprises a CSI-ResourcePeriodicityAndOffset parameter that indicates the period and the plurality of offsets.

15. A method for wireless communication at a base station, the method comprising:
transmitting, to a user equipment, a channel state information reference signal configuration (CSI-RS configuration) that indicates a period and a plurality of offsets, wherein the period and the plurality of offsets are associated with a channel state information reference signal (CSI-RS) transmission;
transmitting the CSI-RS transmission to the user equipment via a wireless channel of a shared radio frequency spectrum band according to the period and at least one of the plurality of offsets;
transmitting to the user equipment an indication that one or more of the plurality of offsets was not used for the CSI-RS transmission; and
receiving a measurement report from the user equipment after sending the CSI-RS.

16. The method of claim 15, wherein the CSI-RS configuration comprises a CSI-ResourcePeriodicityAndOffset parameter that indicates the period and the plurality of offsets.

17. The method of claim 15, wherein the CSI-RS configuration comprises:
a first CSI-ResourcePeriodicityAndOffset parameter that indicates the period and a first one of the plurality of offsets; and
a second CSI-ResourcePeriodicityAndOffset parameter that indicates the period and a second one of the plurality of offsets.

18. The method of claim 17, wherein a CSI-RS-Resource config parameter comprises the first CSI-ResourcePeriodicityAndOffset parameter and the second CSI-ResourcePeriodicityAndOffset parameter.

19. The method of claim 15, wherein the CSI-RS configuration comprises:
a first CSI-ResourcePeriodicityAndOffset parameter that indicates a first period and a first one of the plurality of offsets; and
a second CSI-ResourcePeriodicityAndOffset parameter that indicates a second period and a second one of the plurality of offsets, wherein the second period is different from the first period.

20. The method of claim 19, wherein a CSI-RS-Resource config parameter comprises the first CSI-ResourcePeriodicityAndOffset parameter and the second CSI-ResourcePeriodicityAndOffset parameter.

21. The method of claim 15, wherein the measurement report is based on a measurement conducted using one of the plurality of offsets.

22. The method of claim 15, further comprising:
transmitting downlink control information comprising a zero-power CSI-RS (ZP-CSI-RS) indicator, wherein the ZP-CSI-RS indicator corresponds to a resource allocated for the one or more of the plurality of offsets that was not used for the CSI-RS transmission.

23. The method of claim 15, further comprising:
transmitting a slot format indicator (SFI) that indicates that a first symbol corresponding to a first one of the plurality of offsets is designated as a flexible symbol, wherein the first symbol corresponds to the one or more of the plurality of offsets that was not used for the CSI-RS transmission.

24. The method of claim 15, wherein transmitting the CSI-RS transmission comprises transmitting a CSI-RS multiplexed with a synchronization signal block (SSB).

25. The method of claim 15, wherein transmitting the CSI-RS comprises transmitting a CSI-RS multiplexed with a discovery reference signal (DRS).

26. The method of claim 15, wherein transmitting the CSI-RS configuration comprises transmitting the CSI-RS configuration via downlink control information or a physical broadcast channel message.

27. The method of claim 15, further comprising:
determining at least one communication parameter for communicating with the user equipment based on the measurement report.

28. A base station, comprising:
a transceiver;
one or more memories storing processor-executable code; and
one or more processors configured to execute the processor-executable code to cause the base station to:
transmit, to a user equipment via the transceiver, a channel state information reference signal configuration (CSI-RS configuration) that indicates a period and a plurality of offsets, wherein the period and the plurality of offsets are associated with a channel state information reference signal (CSI-RS) transmission;
transmit the CSI-RS transmission to the user equipment via the transceiver and a wireless channel of a shared radio frequency spectrum band according to the period and at least one of the plurality of offsets;
transmit, to the user equipment via the transceiver, an indication that one or more of the plurality of offsets was not used for the CSI-RS transmission; and
receive a measurement report from the user equipment via the transceiver after sending the CSI-RS.

* * * * *